United States Patent
Wieman et al.

(10) Patent No.: US 11,392,833 B2
(45) Date of Patent: Jul. 19, 2022

(54) NEURAL ACOUSTIC MODEL

(71) Applicant: SoundHound, Inc., Santa Clara, CA (US)

(72) Inventors: Maisy Wieman, Boulder, CO (US); Andrew Carl Spencer, Longmont, CA (US); Zili Li, San Jose, CA (US); Cristina Vasconcelos, Montreal (CA)

(73) Assignee: SoundHound, Inc., Santa Clara, CA (US)

(*) Notice: Subject to any disclaimer, the term of this patent is extended or adjusted under 35 U.S.C. 154(b) by 423 days.

(21) Appl. No.: 16/790,643

(22) Filed: Feb. 13, 2020

(65) Prior Publication Data

US 2021/0256386 A1    Aug. 19, 2021

(51) Int. Cl.
*G06N 3/08* (2006.01)
*G10L 15/16* (2006.01)
*G10L 15/22* (2006.01)
*G06N 3/04* (2006.01)

(52) U.S. Cl.
CPC ........... *G06N 3/084* (2013.01); *G06N 3/04* (2013.01); *G10L 15/16* (2013.01); *G10L 15/22* (2013.01)

(58) Field of Classification Search
CPC .......... G06N 3/084; G06N 3/04; G10L 15/16; G10L 15/22
See application file for complete search history.

(56) References Cited

U.S. PATENT DOCUMENTS

| | | | |
|---|---|---|---|
| 2020/0046244 A1* | 2/2020 | Alam | A61B 5/349 |
| 2020/0118544 A1* | 4/2020 | Lee | G10L 15/063 |
| 2022/0046057 A1* | 2/2022 | Kutt | H04L 63/1483 |
| 2022/0058483 A1* | 2/2022 | Liu | G06N 3/08 |

FOREIGN PATENT DOCUMENTS

| | | | | | |
|---|---|---|---|---|---|
| CN | 114065809 A | * | 2/2022 | ......... | G06K 9/00536 |
| CN | 108830188 B | * | 3/2022 | ......... | G06K 9/00825 |

OTHER PUBLICATIONS

English Language Accent Classification and Conversion using Machine Learning (Year: 2020).*

(Continued)

*Primary Examiner* — Mohammad K Islam
(74) *Attorney, Agent, or Firm* — Dana Legal Services; Jubin Dana

(57) ABSTRACT

An audio processing system is described. The audio processing system uses a convolutional neural network architecture to process audio data, a recurrent neural network architecture to process at least data derived from an output of the convolutional neural network architecture, and a feed-forward neural network architecture to process at least data derived from an output of the recurrent neural network architecture. The feed-forward neural network architecture is configured to output classification scores for a plurality of sound units associated with speech. The classification scores indicate a presence of one or more sound units in the audio data. The convolutional neural network architecture has a plurality of convolutional groups arranged in series, where a convolutional group includes a combination of two data mappings arranged in parallel.

28 Claims, 9 Drawing Sheets

(56) References Cited

OTHER PUBLICATIONS

Prosodic-Enhanced Siamese Convolutional Neural Networks for Cross-Device Text-Independent Speaker Verification (Year: 2018).*
Convolutional Recurrent Neural Networks for Urban Sound Classification using Raw Waveforms (Year: 2018).*
Two stream convolution neural networks for sound classification (Year: 2021).*
Tara N. Sainath, et al., Convolutional, long short-term memory, fully connected deep neural networks. In 2015 IEEE International Conference on Acoustics, Speech and Signal Processing (ICASSP) Apr. 19, 2015 (pp. 4580-4584). IEEE.
Karen Simonyan, et al., Very deep convolutional networks for large-scale image recognition. arXiv preprint arXiv:1409.1556. Sep. 4, 2014.
Kaiming He, et al., Deep residual learning for image recognition. InProceedings of the IEEE conference on computer vision and pattern recognition 2016 (pp. 770-778).
Sergey Ioffe, et al., Batch normalization: Accelerating deep network training by reducing internal covariate shift. arXiv preprint arXiv: 1502.03167. Feb. 11, 2015.
W. Xiong, et al., The Microsoft 2017 conversational speech recognition system. In 2018 IEEE international conference on acoustics, speech and signal processing (ICASSP) Apr. 15, 2018 (pp. 5934-5938). IEEE.
Jian Tang, et al., Acoustic modeling with densely connected residual network for multichannel speech recognition.
Xiaoyu Liu, Deep convolutional and LSTM neural networks for acoustic modelling in automatic speech recognition.
Golan Pundak, et al., Highway-LSTM and recurrent highway networks for speech recognition.
Dong Yu, et al., Deep Convolutional Neural Networks with Layer-Wise Context Expansion and Attention. InInterspeech Sep. 12, 2016 (pp. 17-21).
Vineel Pratap, et al., Scaling up Online Speech Recognition Using Convnets.
Masakiyo Fujimoto, Factored Deep Convolutional Neural Networks for Noise Robust Speech Recognition. InInterspeech Aug. 17, 2017 (pp. 3837-3841).

* cited by examiner

NEURAL ACOUSTIC MODEL

FIELD OF THE INVENTION

The present technology is in the field of speech processing and, more specifically, related to a neural network architecture for determining a presence of sound units within speech.

BACKGROUND

Recent advances in computing have raised the possibility of realizing many long sought-after voice-control applications. For example, improvements in statistical models, including practical frameworks for effective neural network architectures, have greatly increased the accuracy and reliability of previous speech processing systems. This has been coupled with a rise in wide area computer networks, which offer a range of modular services that can be simply accessed using application programming interfaces. Voice is quickly becoming a viable option for providing a user interface.

As speech is a natural mode of human communication, voice control offers many benefits over traditional user interfaces, such as a keyboard and mouse, or, more recently, a capacitive touch screen. Controlling a device using speech enables users to multitask, such as safely operating a motor vehicle or heavy machinery, or cooking a meal. Voice control devices have thus become popular in the home, where they are often used to ask questions, play music and set reminders. Voice control is also an active research area in automotive systems design.

Despite these advances, users often report that current systems lack human-level responsiveness and intelligence. Translating pressure fluctuations in the air into parsed commands is incredibly difficult. Speech processing typically involves a complex processing pipeline, where errors at any stage can derail a successful machine interpretation. Many of these challenges are not immediately apparent to human beings, who are able to process speech using cortical and sub-cortical structures without conscious thought. Engineers working in the field, however, quickly become aware of the gap between human ability and state of the art machine processing.

In speech processing, an acoustic model may output a probability vector indicating which of a set of linguistic features are present in a small portion of speech. The linguistic features may comprise one or more of senones, phonemes, graphemes, characters, letters, words and sub-word units. In speech processing, a sequence of phonemes over time may be determined, and this may then be mapped to a set of words.

Sainath, Tara N., et al., in their paper "Convolutional, long short-term memory, fully connected deep neural networks", 2015 IEEE International Conference on Acoustics, Speech and Signal Processing (ICASSP), IEEE, 2015 (incorporated herein by reference), describe a neural network model for processing audio data that combines Convolutional Neural Networks (CNNs), Long Short-Term Memory (LSTM) and Deep Neural Networks (DNNs) in one unified architecture. The unified architecture provides a modest 4-6% improvement in word error rate when compared to other LSTM models.

However, the neural network model presented by Sainath was developed within an academic context, and the researchers had access to ample computing resources for training and prediction. There is thus a challenge in providing neural acoustic models that can process audio data within real-time applications and that are able to be implemented within a large variety of computing environments, including portable and embedded devices. There is also a desire for neural acoustic models to provide improved speech processing as compared to older methods, such as Gaussian Mixture Models.

SUMMARY OF THE INVENTION

In accordance with one aspect of the present invention, an audio processing system comprises: a convolutional neural network architecture to process audio data; a recurrent neural network architecture to process at least data derived from an output of the convolutional neural network architecture; and a feed-forward neural network architecture to process at least data derived from an output of the recurrent neural network architecture, wherein the feed-forward neural network architecture is configured to output classification scores for a plurality of sound units associated with speech, the classification scores indicating a presence of one or more sound units in the audio data. The convolutional neural network architecture comprises: a plurality of convolutional groups arranged in series, a convolutional group comprising a combination of two data mappings arranged in parallel.

The use of the plurality of convolutional groups provides an efficient implementation that maintains a low error rate in classification but allows for real-time or near real-time processing on a wide variety of computing devices. The convolutional groups provide a mechanism to reduce a size of (input) audio data in one or more of frequency and time dimensions, e.g. to effectively extract features that may be fed to the recurrent neural network architecture for temporal modelling. The convolution groups with the parallel data mappings further allow for small convolutions to be applied, which may help to reduce a number of multiplications and thus allow for faster execution at run time.

In accordance with various aspects of the present invention, a first of the two data mappings has a greater number of convolution operations than a second of the two data mappings, and the second of the two data mappings comprises a dimensionality reduction operation. The parallel data mapping may thus be seen to model a form of residual function, e.g. where the first of the two data mappings attempts to model an original mapping (i.e. a mapping performed by the first data mapping without the parallel pathway) minus the result of the second of the data mappings. The second of the two data mappings may allow for better back propagation of gradient terms as there are fewer operations. This may improve training and parameter convergence.

In accordance with various aspects of the present invention, a data tensor output by the dimensionality reduction operation has a size that matches a data tensor output by a set of convolution operations on the first of the two data mappings. The convolution operations may reduce a size of the audio data in at least one of time and frequency dimensions. In this case, the dimensionality reduction operation then allows for outputs of both data mappings to be the same size and thus combinable by element-wise addition. The dimensionality reduction further reduces a number of parameters of the audio processing system and thus allows for faster operation with fewer resources.

In accordance with various aspects of the present invention, the dimensionality reduction operation comprises a slice operation to discard data elements in one or more dimensions within the second of the two data mappings. It has been found that it is possible to discard data that relates to the outer edges of a time window that is processed by the audio processing system without a significant reduction in accuracy.

In accordance with various aspects of the present invention, the first of the two data mappings has two convolution operations and the second of the two data mappings has either no convolution operations or one convolution operation.

In accordance with various aspects of the present invention, the audio data comprises a data tensor with at least two dimensions: a first dimension representing features in time and a second dimension indicative of features in frequency. For example, the audio data may comprise a set of frequency information for a plurality of audio frames that are centered on a current audio frame (e.g. a window of audio data within the time domain). At least one of the plurality of convolutional groups may comprise a convolution operation on both of the two data mappings with a stride in the second (frequency) dimension that is greater than one (although such an operation may not be present in all convolutional groups). In other examples, the stride may be equal or greater than one. This may further reduce the size of the processed data allowing for faster computations and providing the possibility of real-time operation. In effect, in certain examples, features in the time and frequency dimensions are extracted and projected along a further dimension that originally represents different frames of audio data (e.g. for different time periods) or different channels relating to these frames. In certain aspects, the convolutional neural network architecture further comprises an initial convolution operation with a stride in the second (frequency) dimension that is greater than one. This may be seen as an initial preprocessing operation that reduces the size of the data within the second (frequency) dimension before the convolutional groups are applied. This effectively condenses information from neighboring frequencies into a lower dimensionality representation. A size of at least one of the first and second dimensions may be reduced within a convolutional group without use of a pooling operation. For example, a size reduction that occurs via the convolution operation and/or via a slicing or other selection operation (e.g. setting padding to 0) may avoid the need to implement a pooling layer, thus again reducing complexity and avoiding a number of computations to speed up operation.

In accordance with various aspects of the present invention, a convolutional group further comprises a batch normalization for data input to the convolutional group as a pre-processing operation. This can help to stabilize training.

In accordance with various aspects of the present invention, the recurrent neural network architecture comprises a plurality of recurrent neural network layers arranged in series and the feed-forward neural network architecture comprises a plurality of feed-forward neural network layers arranged in series. The recurrent neural network architecture and the feed-forward neural network architecture thus comprise "deep" neural networks that are able to model complex non-linear functions. The at least one recurrent neural network layer comprises a single-direction Long Short-Term Memory (LSTM) or a Gated Recurrent Unit (GRU). A single-direction LSTM or GRU may have fewer parameters than a bidirectional LSTM. Bidirectional LSTM are typically suggested in comparative recurrent neural network architectures for audio models; however, in the present case, they are not required as past and future temporal information is processed by way of the windowed audio data that is fed to the convolutional neural network architecture.

In accordance with various aspects of the present invention, the audio processing system further comprises a skip connection for a current audio frame within the audio data that allows the current audio frame to bypass the convolutional neural network architecture. This allows relatively focused or short-term information for a current audio frame to be processed by the recurrent neural network architecture in combination with the feature extraction performed by the convolutional neural network architecture on the longer time window (e.g. the current audio frame and past and/or future audio frames for a relatively short time segment). An audio frame in this context may comprise a one-dimensional vector of frequency features as output by a Mel filter bank and/or may comprise additional feature values that may aid audio processing.

In accordance with various aspects of the present invention, at least one feed-forward neural network layer is provided between the convolutional neural network architecture and the recurrent neural network architecture. The at least one feed-forward neural network layer provides a one-dimensional data tensor as an input for the recurrent neural network architecture, e.g. enables a multidimensional output of the convolutional neural network architecture to be flattened (e.g. via concatenation of consecutive elements) and converted into a one-dimensional data tensor that is of a smaller size and suitable for processing by the recurrent neural network architecture. It may provide a form of bottleneck for training to compress relevant features output by the convolutional neural network architecture.

In accordance with various aspects of the present invention, the classification scores comprise probability values that are output by a softmax activation function of the feed-forward neural network architecture. These probability values may represent senone or phoneme probabilities that may be used in subsequent stages of a speech processing pipeline. The softmax activation function ensures that the scores sum to one and so reflect a probability measure.

In accordance with various aspects of the present invention, at least one attention layer is provided within one or more of the convolutional neural network architecture, the recurrent neural network architecture and the feed-forward neural network architecture. The at least one attention layer may be located within at least one of the two data mappings of the convolutional neural network architecture. In this case, one of the two data mappings may have fewer convolutional operations, and the at least one attention layer may comprise an attention layer on the data mapping that has fewer convolutional operations, the attention layer being configured to output a data tensor that has a smaller size in one or more dimensions than an input data tensor. Alternatively, or in addition, the attention layer may be located between the convolutional neural network architecture and the recurrent neural network architecture, between the recurrent neural network architecture and the feed-forward neural network architecture, and/or upon a skip connection for input audio data that bypasses the convolutional neural network architecture. Applying attention may increase accuracy of classification. In certain cases, the attention layer may also be used as a selection mechanism to also reduce the dimensionality of the data. In these cases, parameters for the attention layer may be learned during training, which may increase accuracy by reducing a need to manually model the selection operation.

In accordance with various aspects of the present invention, a frame selection component may be located before the convolutional neural network architecture to select a plurality of audio frames to use as the audio data input to the convolutional neural network architecture from a plurality of available audio frames. Similarly, a frequency selection component may additionally or alternatively be located before the convolutional neural network architecture to select a subset of frequency bands for audio data to include in the audio data. Applying selection mechanisms in one or more of the frequency and time dimensions may reduce the number of parameters needed to provide the audio processing system and thus allow for faster computations on a wider variety of computing devices. Frequency selection may be particularly advantageous as it may enable different frequency bands to be processed, e.g. low frequency and high frequency bands may be selected and processed independently in parallel. This is possible if the audio data has a continuous frequency range. It also differs from comparative image processing implementations where extracting bands in one of the spatial dimensions may result in worse performance (as image features may then be split up).

According to another aspect of the present invention, a method of processing audio data comprises: processing the audio data with a convolutional neural network architecture; processing at least an output of the convolutional neural network architecture using a recurrent neural network architecture; and processing at least an output of the recurrent neural network architecture using a feed-forward neural network architecture to determine a set of classification scores for a plurality of sound units associated with speech, the classification scores indicating a presence of one or more sound units in the audio data, wherein processing the audio data with a convolutional neural network architecture further comprises: processing the audio data using a plurality of convolutional groups arranged in series, including combining, within a convolutional group, two data mappings arranged in parallel.

This aspect may provide benefits similar to the first aspect.

In accordance with various aspects of the present invention, processing the audio data using a plurality of convolutional groups arranged in series comprises reducing a size of the audio data in one or more of data dimensions associated with time and frequency using a plurality of convolutional operations that are applied in the one or more dimensions. For example, at least one of the plurality of convolutional operations may have a stride in a data dimension associated with time that is greater than one. This may help to reduce a number of parameters to allow for faster practical implementations.

According to another aspect of the present invention, a method of training an audio processing system comprises: obtaining a training data set comprising pairs of audio data and ground truth classifications, wherein the ground truth classifications indicate which of one or more sound units are present in the audio data, the one or more sound units being associated with speech; applying the audio processing system to the audio data within the training data set to determine predicted classification scores, wherein the audio processing system comprises a plurality of neural networks architectures including a convolutional neural network architecture, a recurrent neural network architecture and a feed-forward neural network architecture communicatively coupled in series, wherein the plurality of neural networks architectures have an associated plurality of trainable parameters, wherein the convolutional neural network architecture comprises a plurality of convolutional groups arranged in series, a convolutional group comprising a combination of two data mappings arranged in parallel; and comparing the predicted classification scores to the ground truth classifications within the training data set to determine an update to the plurality of trainable parameters that is backpropagated through the audio processing system, wherein the applying and the comparing are iterated with respect to the training data set to train the plurality of trainable parameters.

This aspect may allow suitable parameter values for the audio processing system of the first aspect to be learnt during a training operation.

According to other aspects of the present invention, a non-transitory computer-readable storage medium may be provided that stores instructions which, when executed by at least one processor, cause the at least one processor to perform one of the aforementioned methods.

DETAILED DESCRIPTION

Introduction

Figure 1:
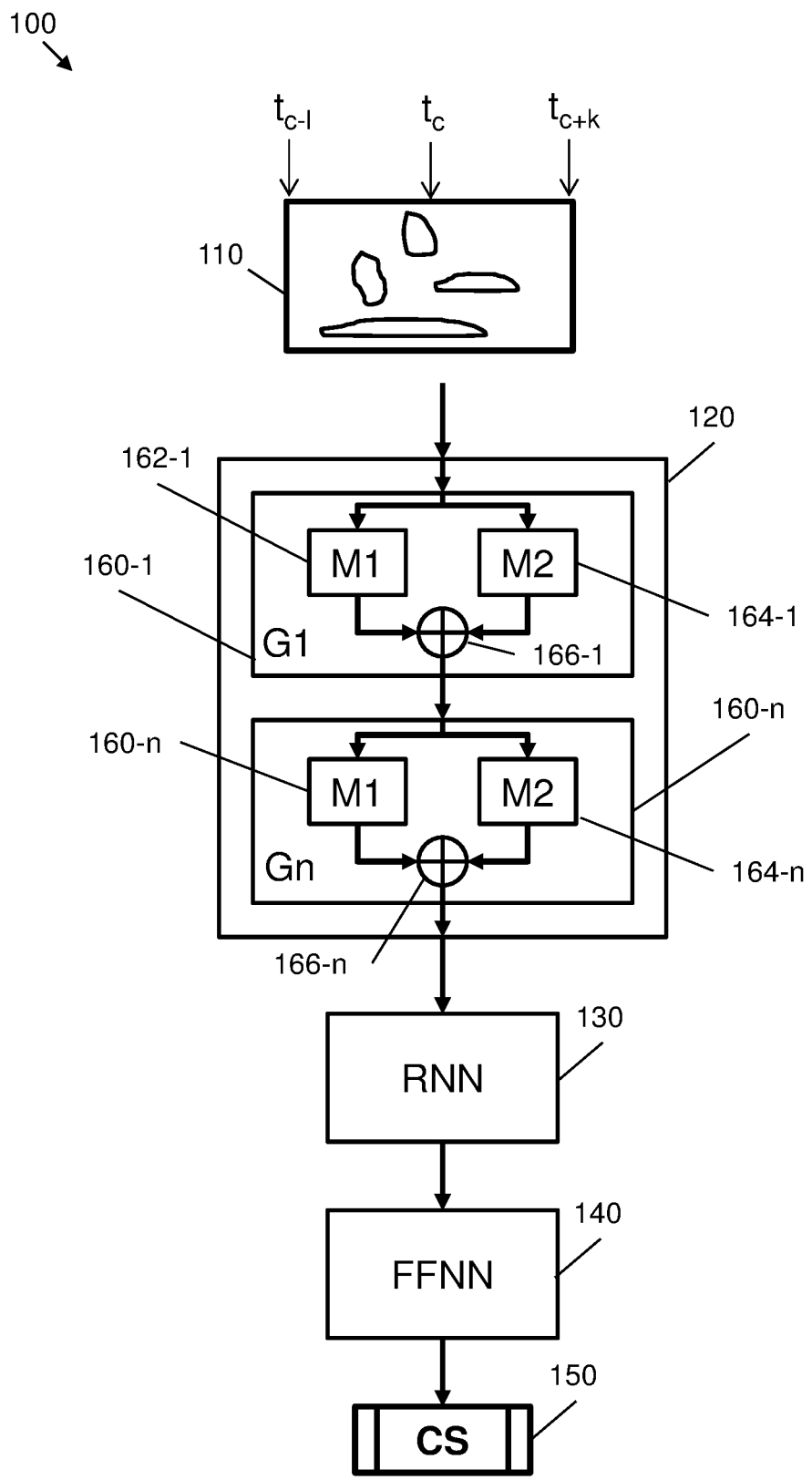
FIG. 1 is a schematic illustration showing an audio processing system according to an embodiment of the invention.

The following describes various examples of the present technology that illustrate various interesting aspects. Generally, examples can use the described aspects in any combination. All statements herein reciting principles, aspects, and examples are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one," "an," "certain," "various," and "cases", "examples" or similar language means that a particular aspect, feature, structure, or characteristic described in connection with the example is included in at least one embodiment of the invention. Thus, appearances of the phrases "in one case," "in at least one example," "in an example," "in certain cases," and similar language throughout this specification may, but do not necessarily, all refer to the same embodiment or similar embodiments. Furthermore, aspects and examples of the invention described herein are merely exemplary, and should not be construed as limiting of the scope or spirit of the invention as appreciated by those of ordinary skill in the art. The disclosed invention is effectively made or used in any example that includes any novel aspect described herein. Furthermore, to the extent that the terms "including", "includes", "having", "has", "with", or variants thereof are used in either the detailed description and the claims, such terms are intended to be inclusive in a similar manner to the term "comprising." In examples showing multiple similar elements, even if using separate reference numerals, some such examples may work with a single element filling the role of the multiple similar elements.

Certain examples described herein relate to an audio processing system. The audio processing system may be used as an acoustic model in an automatic speech recognition system or other speech processing pipeline. The audio processing system may be used to help convert recorded speech into text or machine-processable commands. The audio processing system may be an acoustic model that receives audio data as input and outputs data indicative of sound units determined to be present within the audio data. These sound units may be seen as linguistic features that relate to speech (e.g. human or machine speech). The sound units may comprise one or more of senones, phonemes, graphemes, characters, letters, words and sub-word units. The output of the audio processing system may be used by down-stream speech processing components, such as language models. These down-stream speech processing components may use the data output by the audio processing system to determine a set of words that are spoken within the audio data.

In examples described herein, an audio processing system comprises a plurality of neural network architectures. The term "neural network architecture" refers to a set of one or more artificial neural networks that are configured to perform a particular data processing task. For example, a "neural network architecture" may comprise a particular arrangement of one or more neural network layers of one or more neural network types. Neural network types include convolutional neural networks, recurrent neural networks and feed-forward neural networks. Convolutional neural networks involve the application of one or more convolution operations. Recurrent neural networks involve an internal state that is updated during a sequence of inputs. Recurrent neural networks are thus seen as including a form of recurrent or feedback connection whereby a state of the recurrent neural network at time (e.g. t) is updated using a state of the recurrent neural network at a previous time (e.g. t−1). Feed-forward neural networks involve transformation operations with no feedback, e.g. operations are applied in a one-way sequence from input to output. Feed-forward neural networks are sometimes referred to as plain "neural networks", "fully-connected" neural networks, or "dense", "linear", or "deep" neural networks (the latter when they comprise multiple neural network layers in series).

A "neural network layer", as typically defined within machine learning programming tools and libraries, may be considered an operation that maps input data to output data. A "neural network layer" may apply one or more weights to map input data to output data. One or more bias terms may also be applied. The weights and biases of a neural network layer may be applied using one or more multidimensional arrays or matrices. In general, a neural network layer has a plurality of parameters whose value influence how input data is mapped to output data by the layer. These parameters may be trained in a supervised manner by optimizing an objective function. This typically involves minimizing a loss function. A convolutional neural network layer may apply a specified convolution operation. A recurrent neural network layer may apply a series of operations to update a recurrent state and transform input data. The update of the recurrent state and the transformation of the input data may involve transformations of one or more of a previous recurrent state and the input data. A recurrent neural network layer may be trained by unrolling a modelled recurrent unit, as may be applied within machine learning programming tools and libraries. Although a recurrent neural network such as a Long Short-Term Memory (LSTM) or Gated Recurrent Unit (GRU) may be seen to comprise several (sub) layers to apply different gating operations, most machine learning programming tools and libraries refer to the application of the recurrent neural network as a whole as a "neural network layer" and this convention will be followed here. Lastly, a feed-forward neural network layer may apply one or more of a set of weights and biases to input data to generate output data. This operation may be represented as a matrix operation (e.g. where a bias term may be included by appending a value of 1 onto input data). Alternatively, a bias may be applied through a separate addition operation.

To model complex non-linear functions, a neural network layer as described above may be followed by a non-linear activation function. Common activation functions include the sigmoid function, the tanh function, and Rectified Linear Units (RELUs). Many other activation functions exist and may be applied. A softmax activation may be applied to convert a set of logits or scores into a set of probability values that sum to 1. An activation function may be selected based on testing and preference. Activation functions may be omitted in certain circumstances, and/or form part of the internal structure of a neural network layer.

In examples described herein an audio processing system comprises a plurality of neural network architectures, wherein each neural network architecture includes, primarily, a set of neural network layers of a given neural network type. In examples, the audio processing system comprises a convolutional neural network architecture, a recurrent neural network architecture and a feed-forward neural network architecture. The different neural network architectures are communicatively coupled at least in series. Each neural network architecture may comprise a plurality of neural network layers, where the majority of neural network layers are of the indicated type. For example, a convolutional neural network architecture may comprise a plurality of convolutional neural network layers that make up the majority of the layers used in the architecture, but other types of neural network layers may be used as sub-components of the wider architecture, e.g. a feed-forward neural network layer may be used as an attention layer or the like within the convolutional neural network architecture.

Certain examples described herein provide adaptations to the convolutional, long short-term memory, fully connected deep neural network model proposed by Sainath in the aforementioned paper. The adaptations speed up total operation time, allowing for faster training and/or inference, and further allow acoustic models that include a plurality of neural network architectures to be implemented on a wider variety of computing hardware (e.g. avoiding a need for hundreds of Graphical Processing Units—GPUs—or Tensor Processing Units—TPUs).

In certain examples, the convolutional neural network architecture within the audio processing system is specifically adapted to provide high accuracy with a limited number of computing operations. To achieve this, the convolutional neural network architecture is configured with a plurality of convolutional groups arranged in series. A convolutional group in these examples comprises a combination of two data mappings arranged in parallel. A data mapping may comprise an application of a neural network layer or other data processing operation. At least one of the two data mappings comprises a convolutional neural network layer, e.g. to perform a convolution operation. The convolutional group may be said to implement a residual mapping, whereby the combination of the two data mappings adapts a first original mapping based on an output of a parallel second data mapping. The convolutional group is so-called as it comprises an input and an output for data and applies at least one convolutional operation, where in certain examples a plurality of convolutional operations may be applied across one or more of two parallel data pathways.

The examples of audio processing systems as described herein are configured to be trained using an approach called backpropagation. A training set is supplied that consists of pairs of input and output data. The plurality of neural network architectures described in examples are communicatively coupled to form a compute graph, wherein the audio processing system may be trained as a whole (sometimes referred to as "end-to-end" training). The output data is often called a "ground truth" label as it represents what the output should be. In speech processing, this may be one or more labelled sound units for a segment of a speech recording. During backpropagation, the neural network layers that make up each neural network architecture are initialized (e.g. with randomized weights) and then used to make a prediction using a set of input data from the training set (e.g. a so-called "forward" pass) as applied to the input of the audio processing system. The prediction is compared with the corresponding "ground truth" output data from the training set and an error is computed. The error may form part of a loss function. If gradient descent methods are used, the error is used to determine a gradient of the loss function with respect to the parameters of the audio processing system, where the gradient is then used to back propagate an update to the parameter values through the plurality of neural network architectures. Typically, the update is propagated according to the derivative of the weights of the neural network layers. For example, a gradient of the loss function with respect to the weights of the neural network layers may be determined and used to determine an update to the weights that minimizes the loss function. In this case, optimization techniques such as gradient descent, stochastic gradient descent, Adam etc. may be used to adjust the weights. The chain rule and auto-differentiation functions may be applied to efficiently compute the gradient of the loss function, e.g. starting from the output of the audio processing system and working back through the neural network layers of each neural network architecture in turn.

Examples as described herein may thus provide an efficient acoustic model that may be trained end-to-end in a supervised manner and that may allow real-time or near real-time application (e.g. during inference) to map audio data to scores or probabilities for a set of sound units associated with speech.

Example Audio Processing System

FIG. 1 shows an example audio processing system 100. The audio processing system 100 operates on audio data 110 that is input to the system. In the present example, the audio data 110 comprises a plurality of audio frames, where each audio frame is associated with a different time period. For example, an audio frame may comprise a one-dimensional array that represents frequency features as determined over a defined time window (e.g. a short 5 or 10 ms window). The plurality of audio frames may thus collectively comprise a two-dimensional array that represents a spectrogram or output of a Mel-frequency filter bank over different short time periods, e.g. where the two-dimensional array represents a further longer time period (e.g. 125 or 250 ms). A Mel filter bank may process a filter-bank window of raw (e.g. time-series) audio data to generate each audio frame (i.e. each frequency feature set or column in the two-dimensional data). The filter-bank window may be 25 ms. In the example of FIG. 1, the plurality of audio frames relate to a plurality of respective discrete time periods centered around a current time $t_c$. The audio data 110 may be received from up-stream preprocessing circuitry that maps raw audio data to audio frames. In certain cases, the audio data 110 may comprise processed audio data, or a mixture of processed and raw audio data (e.g. certain raw audio data features may be passed in addition to processed audio data, which may improve accuracy for some configurations). As an example, the audio frames may be computed at a rate of 100 Hz (i.e. 100 frames per second). In this case, the plurality of audio frames may comprise audio data for a predefined time period, such as 25 frames representing a time period of a quarter of a second with each frame representing a frequency output relating to a 10 ms unit. If the plurality of audio frames corresponds to a time window, they may comprise audio frames for one or more of future and past time periods. Audio frames for future time periods may be obtained by delaying the audio data 110 for a short time period before processing, e.g. if a time window comprises 12 "future" frames relating to 120 ms of recorded audio, then the audio data 110 for the audio processing system 100 may be delayed by 120 ms such that a "current" frame relating to a time $t_c$ that is between 120 ms and 130 ms in the past. As the delay is small, it may be added and still allow the audio processing pipeline to respond in what is perceived as a real-time manner, i.e. without considerable delay. The number of past and future audio frames 110 that form the audio data 110 may be configured depending on the implementation. In certain later examples, the audio frames may be dynamically selected to speed up processing. In the example of FIG. 1, there are k future audio frames and l past audio frames, where k may equal l for symmetrical time windows or may differ, e.g. l may be greater than k to reduce an applied delay. In the present examples, processing may be considered to relate to two different time windows—a first shorter time window relates to an audio frame, which may be on the order of 5 or 10 ms, and a second time window relates to a plurality of audio frames, e.g. a longer time period on the order of 100 to 300 ms.

Frequency features as described herein may relate to a magnitude of complex terms resulting from a form of Fourier transform and/or an output of a filter bank configured to determine frequency magnitudes within a given frequency range. In certain cases, phase terms may be ignored, as good performance may be achieved without considering phase information. However, in certain variations, phase information may be provided as an additional channel if it is found to improve accuracy. Although the example of FIG. 1 is described in the context of a one channel input, the audio data 110 may also be expanded to have more than two-dimensions, e.g. in certain cases there may be a third dimension representing different channels, which may be thought of as a stacked set of two-dimensional inputs.

The audio processing system 100 comprises a convolutional neural network architecture 120, a recurrent neural network architecture 130 and a feed-forward neural network architecture 140. The three architectures are communicatively coupled in series such that a result of a previous architecture is processed by a next architecture in the chain (e.g. with or without additional data). The output of the audio processing system 100 comprises a set of classification scores 150 for a plurality of sound units associated with speech. The classification scores indicate a presence of one or more sound units in the audio data 110. For example, the classification scores may indicate whether a particular senone or phoneme is deemed to be present at the current time, $t_c$. If audio frames are generated at a rate of F Hz, then the classification scores may indicate a presence of one or more sound units for a current 1/Fs time period, e.g. a 0.01 s or 10 ms period associated with time $t_c$. The audio processing system 100 may be configured to be iteratively applied at a high rate, e.g. at F Hz, so as to output classification scores 150 for a plurality of discrete points in time. The classification scores 150 over time may be processed by downstream speech processing components to translate the audio data 110 into machine useable data, such as text or set of machine-parseable data that represents a voice command. In one case, the sound units may comprise one or more of senones, phones and phonemes and the classification scores 150 may comprise a probability vector representing probability values for a plurality of possible sound units (e.g. a predefined dictionary of possible sound units). In this case, the classification scores 150 may represent an a posteriori probability of the sound units (also referred to as a posterior probability) given the audio data 110 that may be used by a Hidden Markov Model (HMM) to output a phoneme transcription over a time period of an utterance.

In the audio processing system 100 of FIG. 1, the convolutional neural network architecture 120 comprises a plurality of convolutional groups 160. There may be n such convolutional groups 160 arranged in series. The convolutional groups 160 may differ in function and configuration. In FIG. 1, a convolutional group 160 comprises a combination of two data mappings arranged in parallel. A first convolution group 160-1 has a first data mapping 162-1 arranged in parallel with a second data mapping 164-1. An nth convolution group 160-n also has a first data mapping 162-n arranged in parallel with a second data mapping 164-n. Each data mapping receives data derived from a common convolutional group input. The outputs of the first and second data mappings are combined at a summation component 166 as shown by summation components 166-1 and 166-n. The output of summation component 166 is used to derive the output for the convolutional group. As the convolutional groups 160 are arranged in series an output of a first convolutional group, such as 166-1 in FIG. 1, forms the input for a subsequent convolutional group, such as 166-n in FIG. 1. The number of convolutional groups 160 may be selected based on, amongst others, the nature of the audio data 110, the desired accuracy of the mapping to sound units, available computation resources and/or the desired speed of computation. The output from the last convolutional group, such as 166-n in FIG. 1 is used to derive the output for the convolutional neural network architecture 120.

The recurrent neural network architecture 130 may comprise one or more recurrent neural network layers. For example, the recurrent neural network architecture 130 may comprise one or more recurrent units such as LSTMs or GRUs. Generally, the recurrent units may be one-directional, e.g. where transformations are applied in a forward time direction, rather than bi-directional. This marks a difference from certain comparative architectures for audio processing where bi-directional recurrent units are preferred. Using single direction recurrent neural networks may help to reduce a number of parameters and allow for simpler architectures that are easier to train and quicker to perform inference. Also, use of a recurrent neural network architecture introduces less architectural latency due to not having to wait for future frames to do the backward time direction calculations that are required with bidirectional LSTM architectures. The recurrent neural network architecture 130 may comprise a plurality of recurrent neural network layers (i.e. recurrent units such as LSTMs) in series, i.e. comprise a "deep" recurrent neural network architecture.

The feed-forward network architecture 140 may comprise one or more feed-forward neural network layers, e.g. with corresponding non-linear activation functions. The example of FIG. 1 shows a schematic communicative coupling for ease of explanation. In variations, the neural network architectures may have addition inputs and/or components that are not shown in FIG. 1. Some of these variations are described with reference to the later examples.

Another Example Audio Processing System

Figure 2:
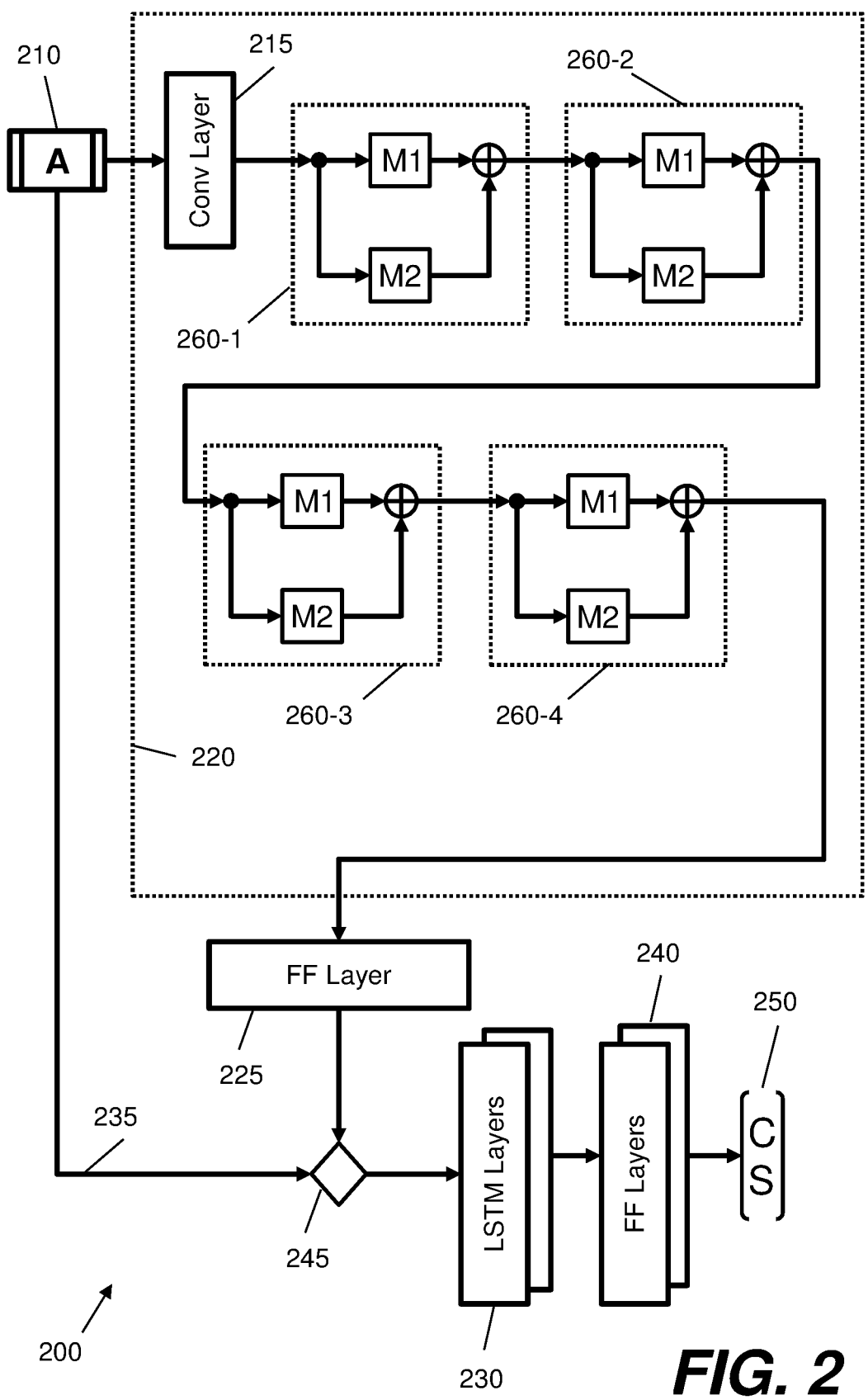
FIG. 2 is a schematic illustration showing an audio processing system according to another embodiment of the invention.

FIG. 2 shows a second example audio processing system 200. This audio processing system 200 is a variation of the audio processing system 100 of FIG. 1. The audio processing system 200 receives audio data 210 as an input. This may comprise audio data as described with reference to FIG. 1. The audio data 210 is shown in FIG. 2 as a multidimensional array, which will be referred to herein as a data tensor, following conventions of machine learning programming libraries. In this example, the audio data 210 comprises a data tensor with at least two dimensions: a first dimension representing features in time and a second dimension indicative of features in frequency. The data tensor may have further dimensions, e.g. representing audio channels or input from multiple microphones. The channels of the data tensor may, for example, represent different forms of the audio input, e.g. IMCRA features that may be derived as adjusted form of a set of Mel filter bank features. The data tensor may thus be of a size (T×FREQ×C). The features in frequency may comprise an output of a set of Mel filter banks and/or frequency magnitude values (including binned or aggregated values) from a Fourier Transform of original audio waveform data (e.g. generated by applying the Fast Fourier Transform to time series waveform measurements such as Pulse-Code Modulation—PCM—audio). Different mixtures of features may be provided as input, e.g. mixtures of raw and processed audio data, time and frequency domain information etc.—the neural network architectures are able to accommodate these differences via the training processing. In one case, an output of a set of Mel filter banks may be combined with additional data such as improved minima controlled recursive averaging (IMCRA) features. Although, frequency features are described in these examples, it is also possible for the second dimension to relate to raw audio amplitudes within the time domain (i.e. time-series data with a time dimension and amplitude or intensity dimension). In this case, conversion to a frequency domain may be implicitly or explicitly applied as part of a data processing pipeline, or the neural network architectures may be trained on the raw audio data (and so may learn to apply functions similar to those that convert from the time domain to the frequency domain). It should be noted that the order of the dimensions does not matter as long as data processing operations are consistently configured, e.g. the data tensor may thus be of a size (FREQ×T×C) or (C×T×FREQ).

The audio processing system 200 of FIG. 2 comprises a convolutional neural network architecture 220, a recurrent neural network architecture 230 and a feed-forward neural network architecture 240, similar to the example of FIG. 1. The convolutional neural network architecture 220 comprises a plurality of convolutional groups 260, a convolutional group having two parallel data mappings that are combined to generate an output of the group. This again is similar to the convolutional groups 160 shown in FIG. 1. In the present example, the audio processing system 200 comprises four such convolutional groups arranged in series. Although the data mappings are shown as M1 and M2 in FIG. 2, it is to be noted that the specific first and second data mappings within each convolutional group may differ, e.g. M1 in the first convolutional group 260-1 may implement a different set of data mappings as compared with M1 in the second convolutional group 260-2 and so on. The first and second data mappings may comprise one or a plurality of data processing operations, including convolutional neural network layers. The relatively small number of convolutional groups (e.g. in a range of 2-10) may differ from comparative image processing convolutional neural network architectures that favor a large number (e.g. 64+) of convolution operations in series.

The audio processing system 200 of FIG. 2 also comprises a number of additional features when compared to the example of FIG. 1. These additional features may improve accuracy and/or allow faster processing. Within the convolutional neural network architecture 220 there is an initial convolutional neural network layer 215 that applies an initial convolution operation before the convolutional groups 260. The initial convolutional operation is configured with a stride in the second dimension (i.e. the frequency feature dimension) that is greater than one. The initial convolution operation may have a relatively large kernel size as compared to the convolution operations used within the convolutional groups 260, e.g. the size of the kernel in the time and frequency dimensions for the initial convolution operation may be greater than the size of the kernel in the time and frequency dimensions for the convolution operations within the convolutional groups 260. For example, the initial convolution operation may have a kernel of size 9×7 in the time and frequency dimensions, whereas the convolution operations within the convolutional groups 260 may have a kernel size of 3×3 and below. By using a stride greater than one the initial convolutional neural network layer 215 may learn parameters that consolidate frequency features over multiple frequency elements, e.g. learn to extract common patterns of change that may be compressed from neighboring frequency elements. In one test example, a stride of 1 in the time dimension and a stride of 4 in the frequency dimension were used for the initial convolutional neural network layer 215, with padding applied in the frequency dimension but not in the time dimension (e.g. padding of 0×3). Different strides in the time and frequency dimensions may be applied depending on implementations. The initial convolutional neural network layer 215 (i.e. the application of the initial convolution operation as described) may help reduce a dimensionality of the input data tensor in one or more of the frequency and time dimensions (e.g. while extending in an additional dimension). This may help reduce the number of later multiplications applied in the frequency and time dimensions, e.g. within further convolution operations within the convolutional groups 260, and so speed up computation and/or allow implementation on a wider variety of computing platforms (i.e. including those with fewer computing resources).

The audio processing system 200 also comprises a feed-forward neural network layer 225 that is positioned between the convolutional neural network architecture 220 and the recurrent neural network architecture 230. This feed-forward neural network layer 225 may be used to convert a size of a one-dimensional data tensor constructed from the output of the convolutional neural network architecture 220 to a size that is suitable for input to the recurrent neural network architecture 230. The feed-forward neural network layer 225 may also act as a form of bottleneck within the audio processing system 200 to compress and consolidate features output by the convolutional neural network architecture 220. If the feed-forward neural network layer 225 reduces a size of a one-dimensional data tensor (i.e. via a weighted data mapping), then this can further reduce a required size of the neural network layers in the latter recurrent neural network architecture 230. If the output received by the feed-forward neural network layer 225 is multidimensional, then this output may be flattened (e.g. arranged in one-dimension) before applying the feed-forward neural network of the feed-forward neural network layer 225.

Also, before the recurrent neural network architecture 230, the audio processing system 200 comprises a skip connection 235 that acts to bypass the convolutional neural network architecture 220. The skip connection 235 passes data from the audio data 210 to the recurrent neural network architecture 230 without the processing of the convolutional neural network architecture 220. This can help improve accuracy by also passing "raw" features associated with the audio data 210 to the recurrent neural network architecture 230. In one case, the skip connection 235 may be configured to pass data from a current audio frame (e.g. similar to the audio frame in FIG. 1 associated with $t_c$ this could be a vector of 40 frequency features) to the recurrent neural network architecture 230. The audio processing system 200 of FIG. 2 uses a concatenation component 245 to combine the output of the feed-forward neural network layer 225 (i.e. an output derived from the convolutional neural network architecture 220) with data passed along the skip connection 235. In one case, if the data comprises a two-dimensional array or matrix then the data may be flattened (i.e. converted to a one-dimensional form by rasterizing the frame) such that the concatenation component 245 joins two one-dimensional arrays.

Although a skip connection 235 is shown that bypasses the convolutional neural network architecture 220, in other cases, or additionally, another skip connection may be provided that bypasses the recurrent neural network architecture 230, e.g. that provides an output derived from the convolutional neural network architecture 220 to the feed-forward neural network architecture 240 and/or that provides the audio data 210 to the feed-forward neural network architecture 240. This may also provide for accuracy improvements.

The recurrent neural network architecture 230 may comprise two or more LSTM units. The number of parameters for these units may be chosen based on implementation requirements (e.g. available memory and computing resources). A test implementation used two LSTMs in series with a hidden layer of size 1024 and an output of size 512, where the first LSTM had an input of length 296 and the second LSTM had an input size equal to the output size of the first LSTM. As described previously, other types of recurrent unit such as GRUs may alternatively be used.

The feed-forward neural network architecture 240 may comprise a plurality of feed-forward (i.e. linear) neural network layers. In one test implementation, two feed-forward neural network layers with RELU activation functions were coupled in series with a further output feed-forward neural network layer with a softmax activation function to output a probability vector. The output size of the output feed-forward neural network layer may be configured based on a number of sound units to be classified (e.g. this may be tens, hundreds or thousands of sound units depending on the implementation and/or the type of sound units that are modelled). In the test implementation, the first two feed-forward neural network layers had an output of size 1024. Due to the softmax activation function, the classification scores 250 output by the feed-forward neural network architecture 240 may be considered a probability vector over the space of possible sound units, where the elements of the probability vector sum to unity. During training, the classification scores of the audio processing system 250 may be compared with one-hot vectors representing a ground truth sound unit deemed to be present in the audio data 210 (or more particularly a current frame associated with that data). In some cases, the ground truth data may not necessarily indicate a certain classification, e.g. there may be some samples where the ground truth classification scores have multiple non-zero values. The sound units may be senones.

Convolutional Groups

Figure 3A:
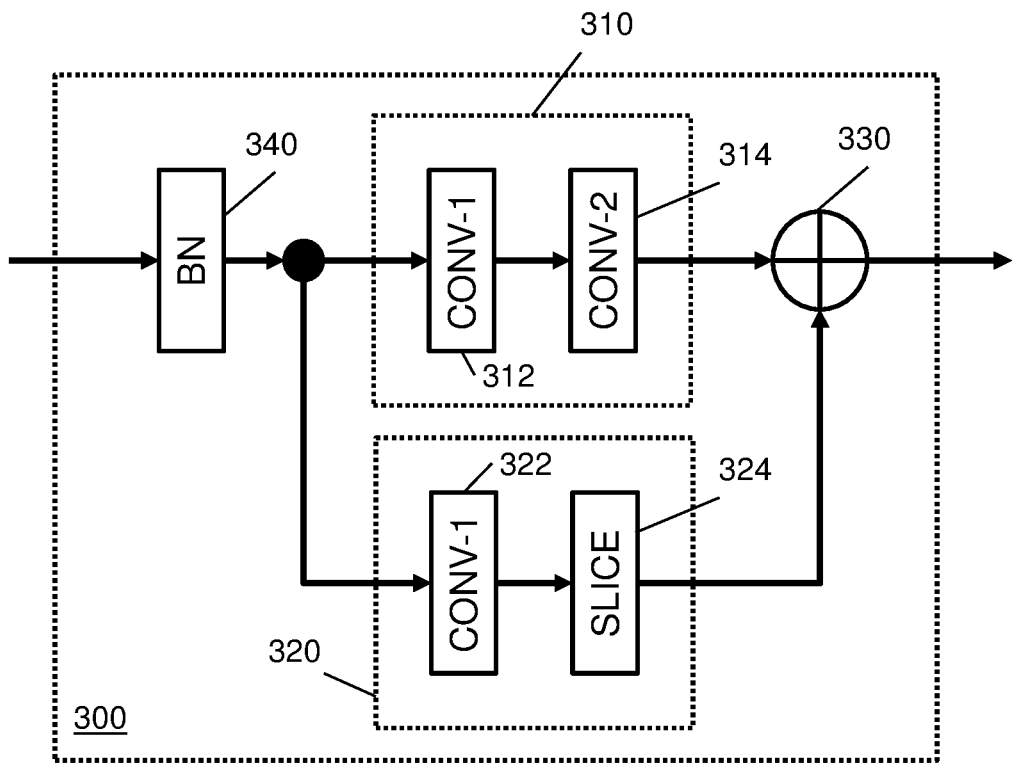
FIGS. 3A and 3B are schematic illustrations showing different example convolutional groups.
Figure 3B:
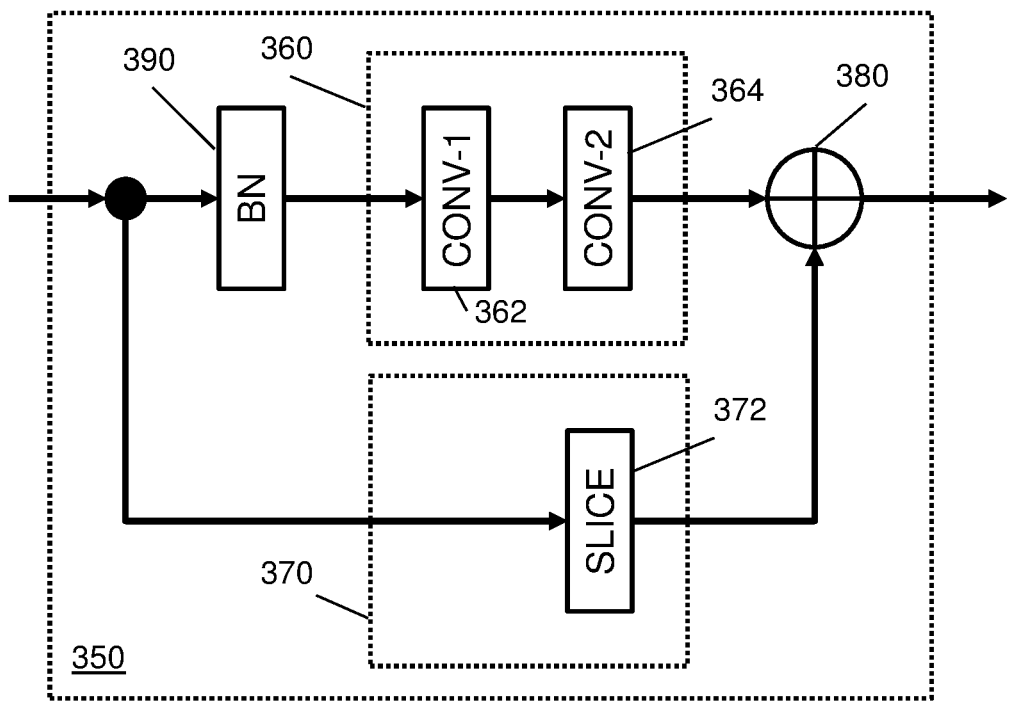

FIGS. 3A and 3B show different example configurations for a convolutional group, such as the groups 160 and 260 in FIGS. 1 and 2. In both example configurations, a first of the two data mappings has a greater number of convolution operations than a second of the two data mappings. In FIGS. 3A and 3B, the first of the two data mappings is shown as an upper data pathway and the second of the two data mappings is shown as a lower data pathway (although the upper and lower ordering of these may be switched with the same functional effect). In the examples of FIGS. 3A and 3B, the first of the two data mappings has two convolution operations while the second of the two data mappings has either no convolution operations or one convolution operation. The second of the two data mappings in both FIGS. 3A and 3B comprises a dimensionality reduction operation. The dimensionality reduction operation is configured to reduce a size of an input data tensor. This may be achieved by discarding certain data elements.

Turning to FIG. 3A, a first convolutional group 300 has a first data mapping 310 and a second data mapping 320. The first data mapping 310 comprises two convolutional neural network layers 312 and 314. The second data mapping 320 comprises a convolutional neural network layer 322 and a dimensionality reduction operation 324. In these examples, the dimensionality reduction operation comprises a "slice" operation that selects a subset of an input data tensor and discards data elements in one or more dimensions (e.g. similar to the pseudo-code operation [x:-y] that omits the first×array elements and the last y array elements). In FIG. 3A, the dimensionality reduction operation 324 discards outer elements in the time dimension (e.g. outer rows for a T×FREQ×C data tensor) so that an output of the second data mapping 320 has a size that matches an output of the first data mapping 310. The outputs of the both the first data mapping 310 and the second data mapping 320 are combined by summation component 330 that implements an element-wise addition of two input data tensors. The output of the summation component 330 is then provided as the output of the first convolutional group 300.

The first convolutional group 300 also comprises a batch normalization component 340 that is configured to provide a batch normalization of the input to the first convolutional group 300 before this data is passed to the first and second data mappings 310, 320. The batch normalization component 340 may scale batches of input data of a predetermined size, such that transformed input data has zero mean and unit variance (i.e. a variance of 1).

FIG. 3B shows a second convolutional group 350. The second convolutional group 350 has a first data mapping 360 that comprises two convolutional neural network layers 362 and 364. This is the same arrangement as the first convolutional group 300 (although the hyperparameters of the layers may differ). However, the second data mapping 370 does not feature a convolution operation and only comprises a dimensionality reduction operation 372. The second data mapping 370 may thus be seen as an identity mapping with size reduction or a form of skip or bypass connection for the first data mapping 360. Similar to the first convolutional group 300, the outputs of the first and second data mappings 360, 370 are summed by a summation component 380 that provides the output to the second convolutional group 350. Similar to the first convolutional group 300, the dimensionality reduction operation 372 in the second data mapping 370 acts to match a size of an output of the first data mapping 360.

The second convolutional group 350 also comprises a batch normalization component 390 that is configured to provide a batch normalization of the input to the first convolutional group 300. However, as the second data mapping 370 does not comprise any convolution operations, the batch normalization component 390 is located on the data pathway of the first data mapping 360 before the first convolutional neural network layer 362.

The use of convolutional neural network layers, i.e. in the convolutional groups 300 and 350, may be defined with fewer parameters than comparative recurrent-only neural network architectures (e.g. deep LSTM systems). This makes the convolutional neural network architectures described herein relatively memory efficient as compared to other forms of architecture. However, convolutional neural network layers often require a high number of multiplications, which can slow down at least an inference stage. For example, there may be kernel_size*n_output_nodes multiplications, where the kernel_size accounts for the number of input dimensions and n_output_nodes reflects an output dimensionality. Depending on the selected size of the convolution kernel, and/or the size of the inputs and outputs, this means that despite the aforementioned potential memory efficiency, certain comparative convolutional neural network architectures may actually increase a number of multiplications as compared to comparative recurrent-only neural network architectures.

The use of convolutional groups as shown in examples herein addresses this issue and provides a memory efficient implementation of the convolutional neural network architecture while also allowing the number of multiplications to be kept relatively low. This can greatly improve the speed of inference, allowing systems to progress from laboratory and academic environments to real world applications. The use of convolutional neural network architectures for speech is relatively experimental, as they are typically designed to process images. In the present examples, they have been found to be adaptable to multidimensional audio data and act to find relationships in spectrogram-like inputs (e.g. frequency features over a given time window). This can then improve the accuracy of the classification for a current audio frame, which is typically set as a predefined location within the time window.

Some example neural network layer configurations will now be described. These are provided for example only and should not be seen as limiting.

In one example implementation, the first, third and fourth convolutional groups 260-1, 260-3 and 260-4 are configured as per the convolutional group 300 of FIG. 3A. The third and fourth convolutional groups 260-3 and 260-4 may have common kernel, stride and padding settings for the three convolutional neural network layers 312, 314 and 322. In one case, the first and second convolutional neural network layers 312 and 314 in the first data mapping 310 of FIG. 3A for the third and fourth convolutional groups 260-3 and 260-4 may have a kernel size of 3×1 and a stride of 1×1 (in respective time and frequency dimensions). No padding may be applied (e.g. padding of 0×0). The convolutional neural network layer 322 in the second data mapping 320 in FIG. 3A of these groups may have a size of 1 and a stride of 1 in both dimensions (i.e. 1×1). In other examples, the convolutional neural network layer 322 may be replaced with a feed-forward or linear neural network layer. The first convolutional group 260-1 may be arranged as per FIG. 3A but with different kernel, paddings and/or stride settings. In one case, the first convolutional neural network layer 312 in the first data mapping 310 of the first convolutional group 260-1 may have a kernel size of 3×3, a stride size of 1×2 and padding of size 0×1 (i.e. 1 in the frequency dimension). The second convolutional neural network layer 314 in the first data mapping 310 of the first convolutional group 260-1 may have a kernel size of 3×1, a stride size of 1×1 and no padding (i.e. 0×0).

In the above example implementation, the second convolutional group 260-2 may be configured as per the convolutional group 350 of FIG. 3B. The first convolutional neural network layer 362 in the first data mapping 360 of the second convolutional group 260-2 may have a kernel size of 3×3, a stride size of 1×1 and padding of size 0×1 (i.e. 1 in the frequency dimension). The second convolutional neural network layer 364 in the first data mapping 360 of the second convolutional group 260-2 may have a kernel size of 3×1, a stride size of 1×1 and no padding (i.e. 0×0).

Using the initial convolutional neural network layer 215 and the convolutional group 260 configurations as described above, an initial one channel input of 25×40×1 (in T×FREQ×C dimensions) may be successively extended in the channel dimension and reduced in the time and frequency dimensions (e.g. to 13×5×64 after the first convolutional group 260-1 and 9×5×64 after the second convolutional group 260-2). Although the audio data is described as one channel in the examples, in other cases it may be multichannel, where the channels (C) may relate to, amongst others: different recorded audio channels, different microphones (e.g. four directional microphones are often used), raw audio (e.g. WAV or time series data) as well as spectrogram-like inputs, and/or different forms of pre-processing (e.g. one channel may comprise a de-noised version of another channel or an original input). The present configurations are able to accommodate these variations. Also, although reference is made to time and frequency dimensions, it should be understood that while a correspondence may be seen at the input to the neural network architectures, as data is processed, these are used as shorthand to refer to the same first and second dimensions, and the features in those dimensions may relate to both time and frequency, as well as additional abstractions as developed by the data processing.

In cases such as the second convolutional group 350 described above, the second data mapping 370 provides an identity mapping or skip connection that passes data from the input to summation component 380, whereas the first data mapping 360 applies a set of convolution operations. The second data mapping 370 thus provides for better back propagation of gradient updates and thus facilitates training. The summation component 380 means that the first data mapping 360 learns a mapping to a target output minus the output of the second data mapping 370. This may be seen as a form of residual and so the first data mapping 360 may be seen as a residual data mapping.

As shown with some of the example configurations of the first and second convolutional groups 300 and 350 described above, the first and second data mappings may provide an input-to-output data mapping that differs from the identity mapping of a skip connection. The examples show a second data mapping with fewer operations than the first data mapping, which provides some benefits for update propagation as found with identity mappings. In this manner, the first and second data mappings may still be considered to provide a form of residual data mapping and skip connection, albeit where these are modified from a comparative simple identity mapping case. In these cases, the residual mapping provided by the first data mapping is a residual formed from the target output minus the second data mapping. This may still provide certain stability benefits and improve training as compared to the identity mapping case, but the additional operations may help reduce a data tensor size as it is processed through the convolutional neural network architecture to allow for fast inference.

It should be noted that a size of data tensor input is reduced in at least one of the first and second dimensions (e.g. time and frequency) within a convolutional group in the examples without use of a pooling operation. Removing the pooling operations that are found in comparative convolutional neural network architectures can reduce the number of computations and improve the speed of audio processing. For example, at least one of the plurality of convolutional groups shown in FIG. 2 has a convolution operation on both of the two data mappings with a stride in the second dimension that is greater than one, and certain convolution operations are described with low or no padding. This is a further difference from comparative convolutional neural network architectures where it is generally taught to maintain the input and output of convolutional groups at a common size (e.g. by using "same" style convolution operations that apply padding and a stride of 1). It is found that with speech input, as opposed to conventional image input, the data processing is more robust to discarding temporal and/or frequency features. This goes against what is typically found in image processing. For speech, in the specific examples herein, input padding may be reduced or removed, and features that relate to the outer portions of the longer input time window (e.g. "excess" time elements) may be discarded in the second data mapping, so that the output size of the first data mapping is equal to the output size of the second data mapping, and both outputs are smaller than the input to the convolutional group.

It should be noted that the number and configuration of the convolutional groups may be varied within the convolutional neural network architecture depending on available computing resources and a desired accuracy level (e.g. more groups may improve accuracy but decrease processing speed). A suitable trade-off may thus be made depending on the application specifications for the audio processing system.

Spectrograms

Figure 4:
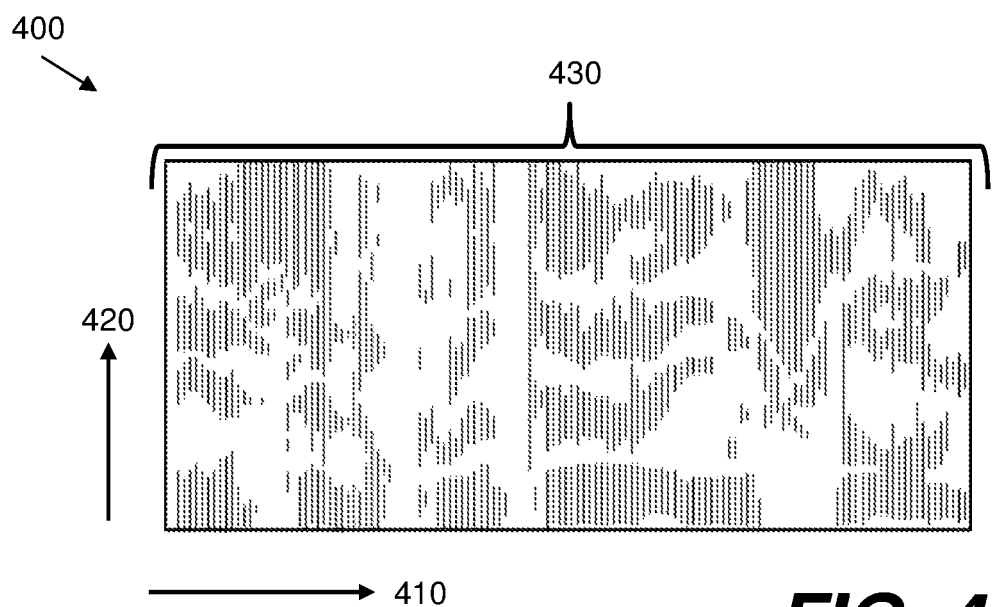
FIG. 4 is a schematic illustration showing a spectrogram according to an embodiment of the invention.

FIG. 4 shows an example spectrogram 400 that may be seen as a visualization of the audio data 110 and 210 in FIGS. 1 and 2. The spectrogram 400 represents a two-dimensional array of data elements having a first dimension 410 that represents a time axis and a second dimension 420 that represents frequency features. The whole spectrogram may represent a time window 430, e.g. a quarter of a second as described above. In one case, the spectrogram may be a T×FREQ array. In a test case, T may equal 25 and FREQ may equal 40, representing an output of a filter bank having 40 different filters, each filter covering a different frequency range. In these cases, the value of each data element may represent a magnitude for a particular frequency or frequency range at a particular time. The values of data elements may be preprocessed, e.g. normalized or converted to a logarithmic scale.

Frame and Frequency Selection

In certain examples, an audio processing system as described herein (e.g. system 100 or 200 in FIGS. 1 and 2) may further comprise a frame selection component located before the convolutional neural network architecture. The frame selection component may act as a form of pre-processor to modify the audio data that is processed by the neural network architectures of the audio processing system. In one case, the frame selection component may reduce a dimensionality of the audio data prior to the convolutional neural network architecture so as to reduce the number of computations performed by that architecture.

Figure 5:
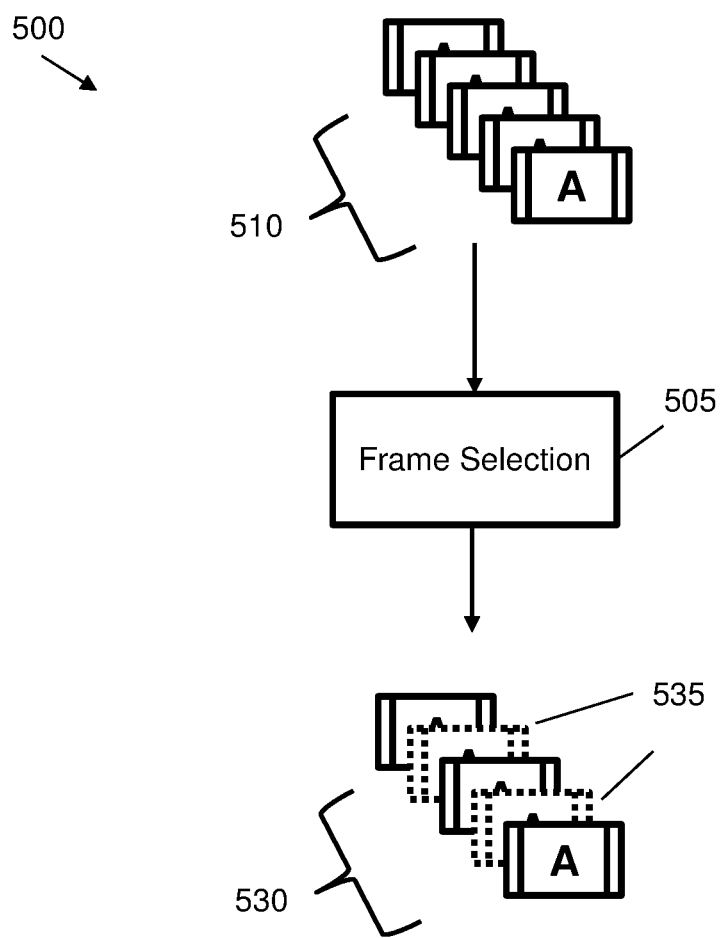
FIG. 5 is a schematic illustration showing a frame selection component according to an embodiment of the invention.

FIG. 5 shows an example 500 of a frame selection component 505. The frame selection component 505 receives a plurality of audio frames 510. These form an original or first set of input audio data. These represent a set of available audio frames for selection. Collectively they may represent a spectrogram-like input as shown in FIG. 4. The frame selection component 505 is configured to select a subset of the plurality of audio frames 505 to use as the input audio data for the convolutional neural network architecture. This may be considered as selecting certain columns or shorter time windows from the spectrogram 400 of FIG. 4. The output of the frame selection component 505 is shown as audio frames 530, where the second and fourth frames 535 are omitted. Hence, the dimensionality in a time dimension is reduced from 5 to 3.

Selecting frames may allow for certain input audio frames (i.e. arrays of audio data) to be skipped. This may reduce a number of multiplications at inference time and improve a speed of processing for real-time or near real-time operation. It is possible to skip processing for audio frames that have only small differences from their prior frame. For example, during long vowels and segments of non-speech there is little extra information in later frames than earlier ones. It is desired not to skip too many consecutive frames because, for example, if one long vowel transitions gradually to another, then certain intermediate frames may be required to recognize both (e.g. to distinguish the words "loo" and "luau").

Figure 6A:
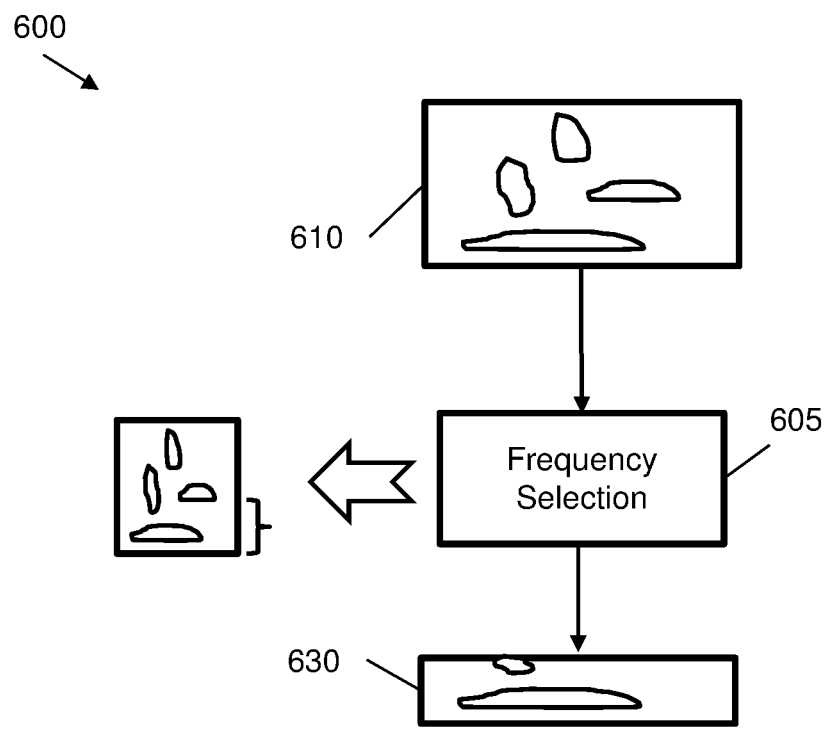
FIG. 6A is a schematic illustration showing a frequency selection component according to an embodiment of the invention.
Figure 6B:
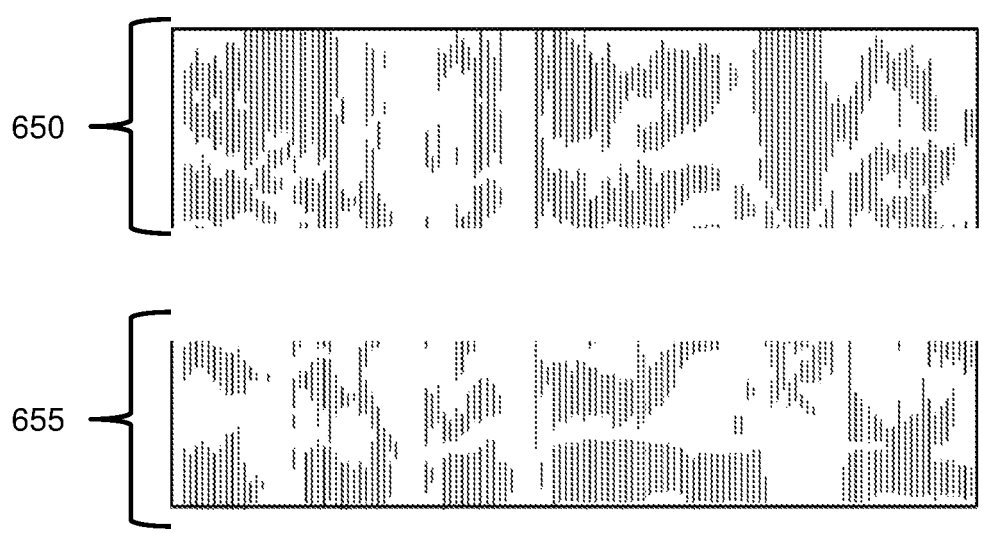
FIG. 6B is a schematic illustration showing an example separation of different frequency bands with the frequency selection component of FIG. 6A.

FIGS. 6A and 6B show an analogous process whereby dimensionality is reduced in a frequency dimension via frequency selection. FIG. 6A shows an example 600 of a frequency selection component 605 located before the convolutional neural network architecture described herein to select a subset of frequency bands to include in the audio data. Like the frame selection component 505, the frequency selection component 605 receives original audio data 610, which in this case has an extent in the time and frequency dimensions similar to the audio data 110 of FIG. 1. The frequency selection component 605 selects a subset of data elements within the original audio data 610 that relate to a subset of frequency bands. These are then output as modified audio data 630, which has a reduced dimensionality in the frequency dimension.

FIG. 6B shows how audio data in the form of a spectrogram similar to that shown in FIG. 4 may be split into two frequency bands by a frequency selection component such as that shown in FIG. 6A. Two frequency bands are shown as a simple example here, but actual implementations may split into a large number of frequency bands (e.g. 10 or 100) and select frequencies by selecting a subset of these frequency bands, such as every other band as controlled by a stride parameter. Here, the spectrogram is split into a first portion 650 that represents high-frequency features and a second portion 655 that represents low-frequency features. The frequency selection component 605 may output both portions as two different data streams, or parallel components may be used to output each portion. In certain cases, it may be more efficient to apply smaller neural network models to the two portions in parallel and then combine the output classification scores. For example, vowels and consonants may have features that primarily reside in different areas of the frequency spectrum. This marks a difference from comparative image processing systems where it is often not possible to separate bands of the two-dimensional data in this manner (as an object may be at a variety of orientations and positions within an image). When processing speech, it may be advantageous in certain examples to operate on frequency bands, e.g. so as to capture formants.

Frequency selection may also be implemented by increasing a stride length in the frequency dimension during convolution operations (e.g. within the convolutional neural network layers described herein). This may be seen as frequency selection across alternating groups of frequencies. For example, a stride length of 1 in a frequency dimension would result in an overlapping application of a convolution kernel but increasing the stride length to be greater than 1 in the frequency dimension reduces this overlap. By configuring the stride in the frequency dimension, a trade-off between accuracy and speed of implementation may be achieved.

Attention

In certain variations of the example audio processing system described herein, one or more attention layers may be used. An attention layer may be a neural network layer that is configured to apply neural attention. Neural attention may be thought of as a mechanism to derive a set of attention weights that may be used to weight a set of input features. The attention weights may be determined as a function of an input data tensor, where this function may comprise a set of trainable parameters, where these parameters may be trained with the other parameters of the audio processing system. Hence, an attention layer may have two sets of inputs: a first set of values to weight, which is normally considered as the input to the attention layer, and a second set of data to determine the attention weights. In one case, the input audio data, or a current audio frame within this data, may be used as the input data tensor to derive the attention weights. In another example, the input to the attention layer may be used to both derive the attention weights (e.g. via a neural network layer) and as an input to be weighted. A set of attention weights may be applied using element-wise multiplication and/or as a weighted sum or average. For example, a form of dot-product attention may be used (e.g. similar to that used in Transformer architectures). In this case, key and/or query values may be calculated by multiplying key and/or query matrices with an input and taking a softmax of the dot product to obtain weights or scores that are used as attention weights. Alternatively, an additive attention mechanism may be used that resembles a fully-connected network, although this may be slower than the dot-product attention. An attention layer may be used at one or more locations within one or more of the convolutional neural network architecture, the recurrent neural network architecture and the feed-forward neural network architecture. The location and form of one or more attention layers may depend on the particular implementation, the available system resources and the operating specification.

Figure 7:
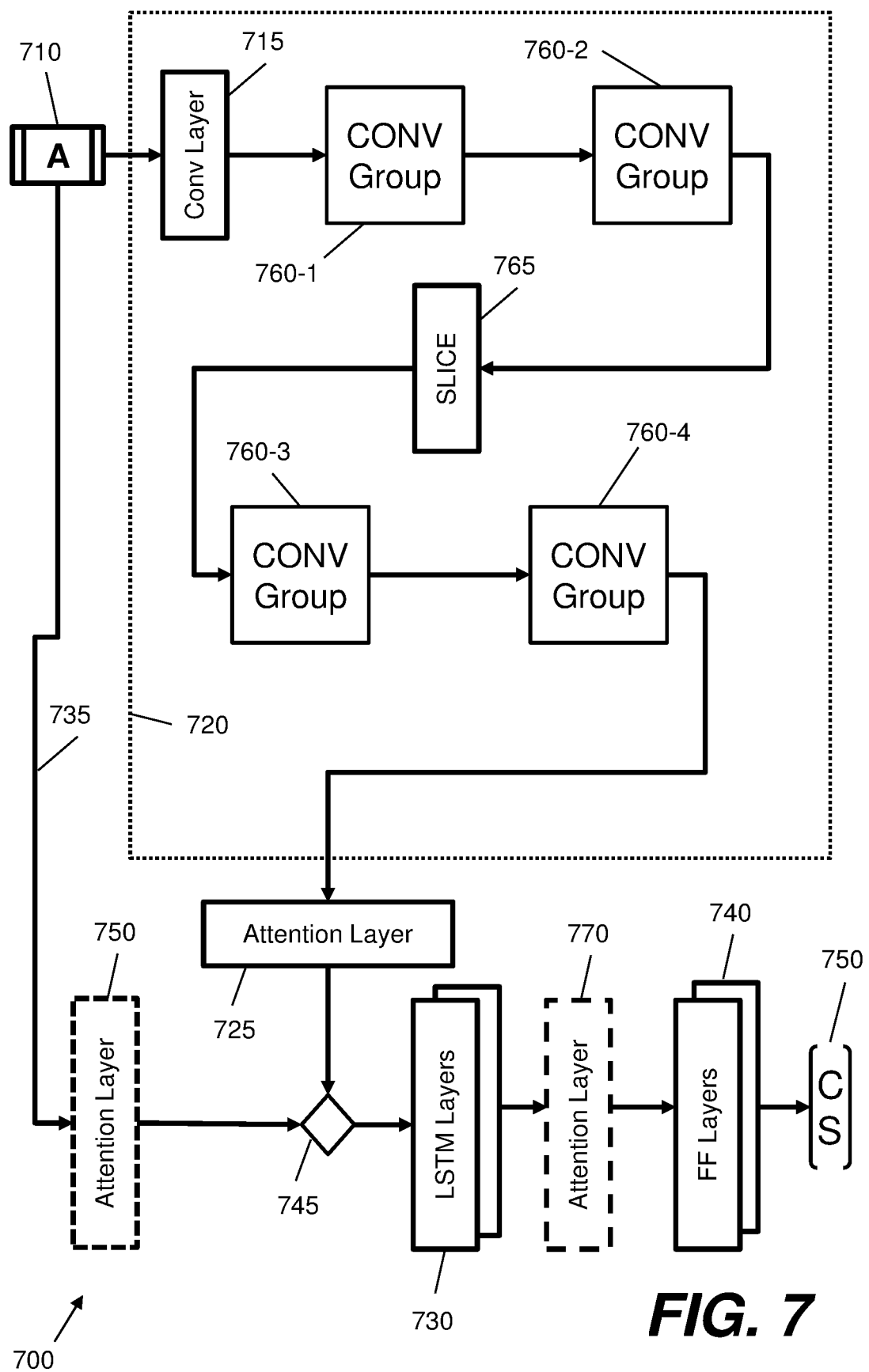
FIG. 7 is a schematic illustration showing an audio processing system with attention layers according to an embodiment of the invention.

FIG. 7 shows an example audio processing system 700 that is a variation of the example audio processing system 200 of FIG. 2. The audio processing system 700 indicates a number of locations where an attention layer may be applied. In the following examples of FIGS. 7, 8A and 8B, e.g. if not explicitly indicated, it may be assumed that details from the examples of FIGS. 2, 3A and 3B may be applied to corresponding features.

Like the audio processing system 200, the audio processing system 700 receives audio data 710 and passes this to a convolutional neural network architecture 720. The convolutional neural network architecture 720 comprises an initial convolutional neural network layer 715, similar to layer 215 in FIG. 2, and four convolutional groups 760 that are coupled in series. The convolutional neural network architecture 720 has an additional variation over the convolutional neural network architecture 220 in that a dimensionality reduction operation 765 is applied after the first two convolutional groups 760-1, 760-2 but before the last two convolutional groups 760-3, 760-4. This may, for example, perform a slice operation in the frequency dimension to remove outer sets of data elements. If the output of the second convolutional group 760-2 is a data tensor of size 9×5×64 (in T×FREQ×C dimensions), the slice operation may discard the first and last columns in the frequency domain, e.g. resulting in a data tensor of size 9×3×64. This may result in a form of bottle neck that forces the initial convolutional neural network layer and the convolutional neural network layers within the first and second convolutional groups 760-1, 760-2 to concentrate features in the center of the data tensor (e.g. and help to ignore uninformative high and low frequency features, e.g. those that may relate to ranges outside of the range of human speech). This additional dimensionality reduction operation 765 may also be applied in the audio processing system 200 of FIG. 2.

Also, in a similar manner to the audio processing system 200, the audio processing system 700 comprises a recurrent neural network architecture 730 and a feed-forward neural network architecture 740, and the feed-forward neural network architecture 740 outputs a set of classification scores 750.

The example of FIG. 7 shows three possible locations for at least one attention layer. In FIG. 7, a first attention layer 725 is located between the convolutional neural network architecture 720 and the recurrent neural network architecture 730. In this example, the first attention layer 725 takes the place of the feed-forward neural network layer 225 in FIG. 2; in other examples, the first attention layer 725 may be provided in a similar location in addition to the feed-forward neural network layer 225 of FIG. 2. The first attention layer 725 may be used when projecting the final output of the convolutional neural network architecture 720 to a flat structure that may be processed by the recurrent neural network architecture 730. For example, the first attention layer 725 may compute a weighted sum of a multidimensional data tensor output by the convolutional neural network architecture 720 to provide a one-dimension (i.e. vector) input for the recurrent neural network architecture 730.

The second and third locations for at least one attention layer are shown with dotted lines in FIG. 7. In practice, one or more attention layers may be provided at a respective one or more of the indicated locations depending on implementation and configuration. A second attention layer 750 is located upon the skip connection 735 for the audio data 710 that bypasses the convolutional neural network architecture 720. In this case, instead of a current audio frame that is passed to the concatenation component 745 for concatenation with the output of the first attention layer 725, the second attention layer 750 may receive as input a multidimensional data tensor derived from the audio data 710 (including, possibly, the audio data 710 itself) and output a single dimension (i.e. vector) data tensor for the concatenation.

A third attention layer 770 is shown located between the recurrent neural network architecture 730 and the feed-forward neural network architecture 740. The third attention layer 770 may receive a plurality of outputs from the recurrent neural network architecture 730 (e.g. relating to a plurality of time steps) and weight these with a set of attention weights to generate a one-dimensional data tensor output for processing by the feed-forward neural network architecture 740. If a last LSTM unit that forms part of the recurrent neural network architecture 730 outputs vectors with a length of 1024, the third attention layer 770 may map a 1024×N data tensor to a 1024-length data tensor where N equals a number of buffered time step outputs from the last LSTM unit. For example, the attention weights may be used to compute a weighted sum over the set of N columns for each of the 1024 rows, in effect attending to different features over a short recent time period (e.g. the last N time steps).

In the example of FIG. 7, the first to third attention layers 725, 750 and 770 may function in a similar manner, e.g. a set of attention weights may be applied over a multi-dimensional data tensor input to output a single dimension data tensor output. The attention weights may be determined as a function of a set of learned parameters applied to data derived from the audio data 710 or to data received as input to the attention layers.

Figure 8A:
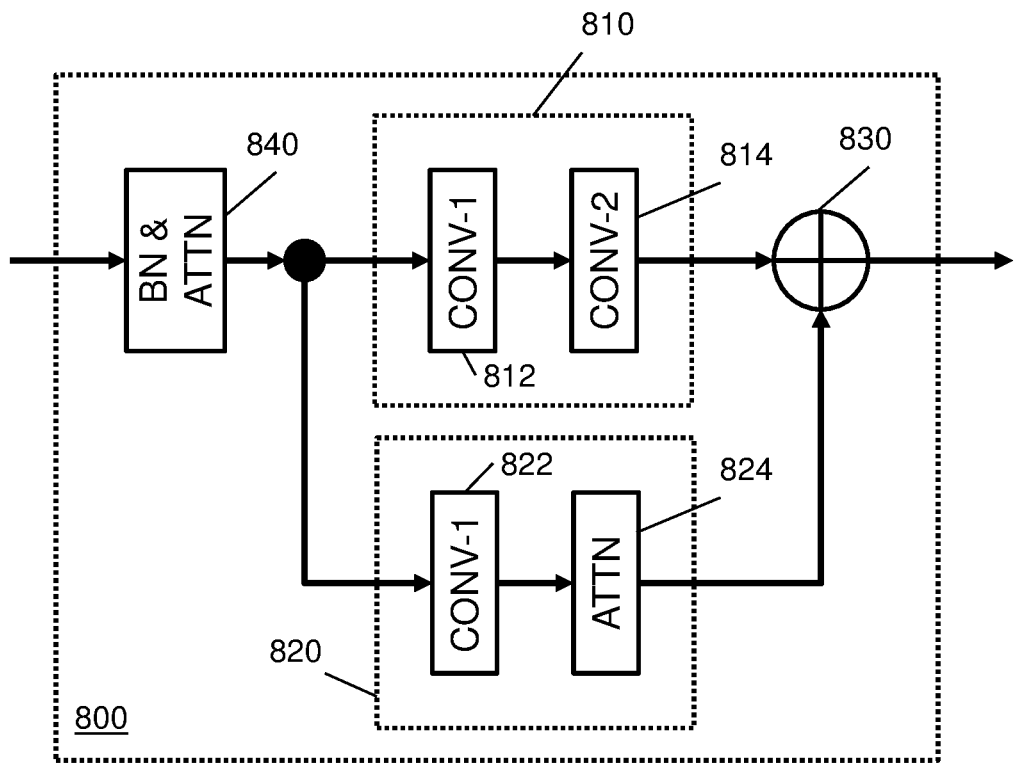
FIGS. 8A and 8B are schematic illustrations showing different example convolutional groups with attention layers.
Figure 8B:
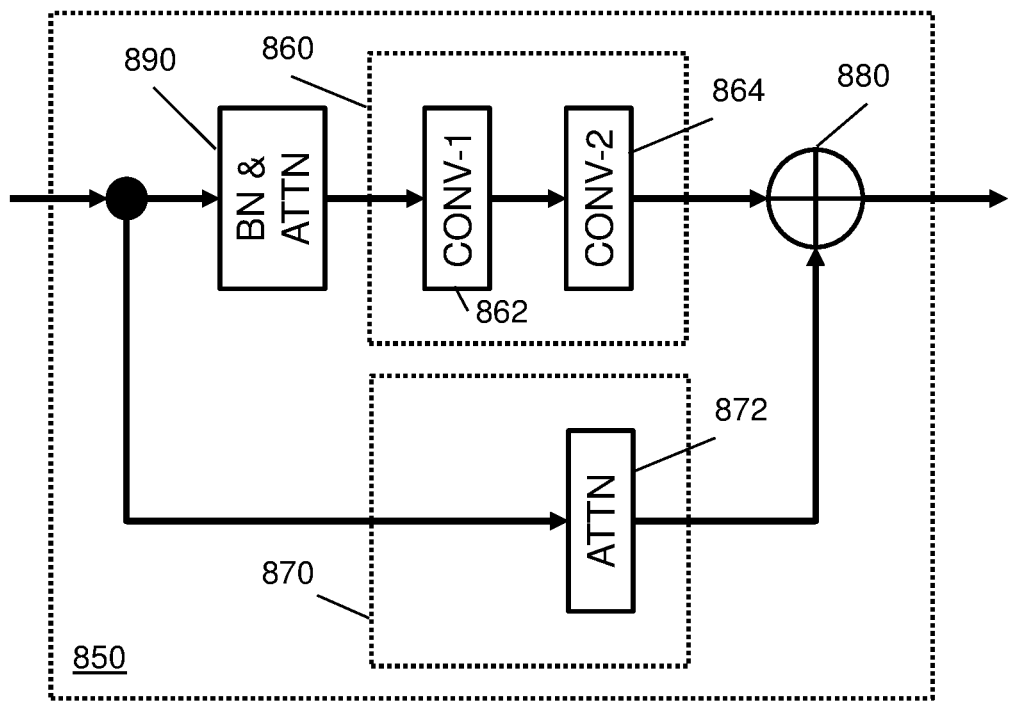

FIGS. 8A and 8B show two more possible locations for attention layers. In these examples, one or more attention layers are located within the one or more of the convolutional groups 760. FIGS. 8A and 8B thus correspond to a variation of FIGS. 3A and 3B with added attention.

FIGS. 8A and 8B show examples, where at least one attention layer is located within at least one of the two data mappings of the convolutional neural network groups 800 and 850. In FIG. 3A, the first data mapping 810 is as FIG. 3A with two convolutional neural network layers 812 and 814. The two data mappings are also again summed via summation component 830. In the second data mapping 820, there is a first convolutional neural network layer 822 as in FIG. 3A. However, in this example, the dimensionality reduction operation 324 in FIG. 3A is replaced with an attention layer 824. Similarly, in FIG. 8B, the first data mapping 860 is as FIG. 3B, with two convolutional neural network layers 862 and 864 and an output of the convolutional group 850 generated via summation component 880. However, the dimensionality reduction operation 372 in the second data mapping 870 of FIG. 3B is also replaced with an attention layer 872. The attention layers 824 and 872 may be configured to apply a set of attention weights and provide an output that has a different size from the input, e.g. to match the outputs of the first data mappings 810 and 860. In these cases, the attention layers 824 and 872 may generate, for an output dimension, a different attention weighted combination of the inputs. In these examples, one of the two data mappings has fewer convolutional operations, and an attention layer is applied on the data mapping that has fewer convolutional operations to output a data tensor that has a smaller size in one or more dimensions than an input data tensor.

FIGS. 8A and 8B also show another location where attention may be applied: before the convolution operations of the first and second data mappings, e.g. at locations 840 and 890 in FIGS. 8A and 8B. In these examples, an attention layer is provided as part of the batch normalization, but alternatively the attention layer could be provided separately, and/or within one or more of the first and second mappings. The attention layer within or before the first and second data mappings may be used to further reduce a size of an initial multi-dimensional data tensor, e.g. in a similar manner to the initial convolutional neural network layers 215 and 715.

Although attention layers are shown for two convolutional groups 800 and 850, it should be noted that certain ones of the convolutional groups 760 may be configured according to FIGS. 3A or 3B and certain ones of the convolutional groups 760 may be configured according to FIGS. 8A or 8B. Similarly, it is possible to use an attention layer similar to the example of FIG. 8A with the example of FIG. 3B and vice versa for FIGS. 3A and 8B.

Method of Processing Audio

Figure 9:
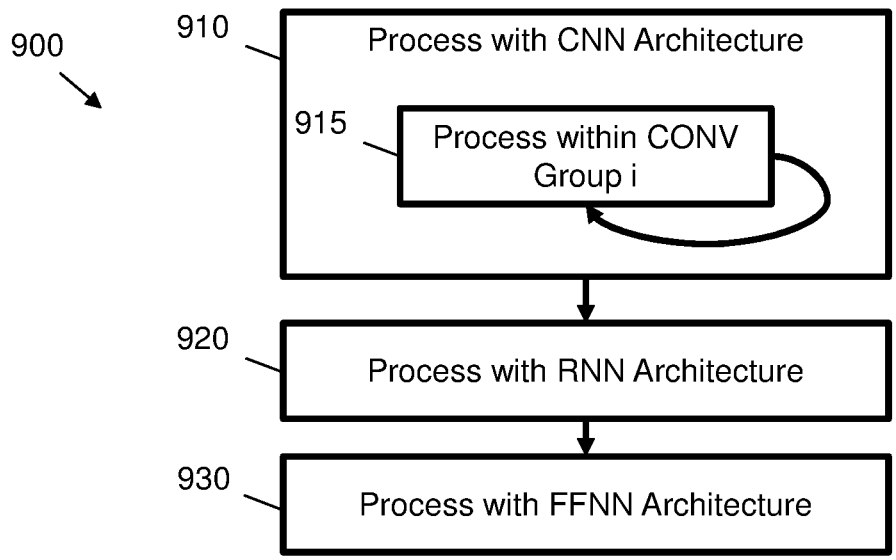
FIG. 9 is a flow diagram showing a method of processing audio data according to an embodiment of the invention.
Figure 10:
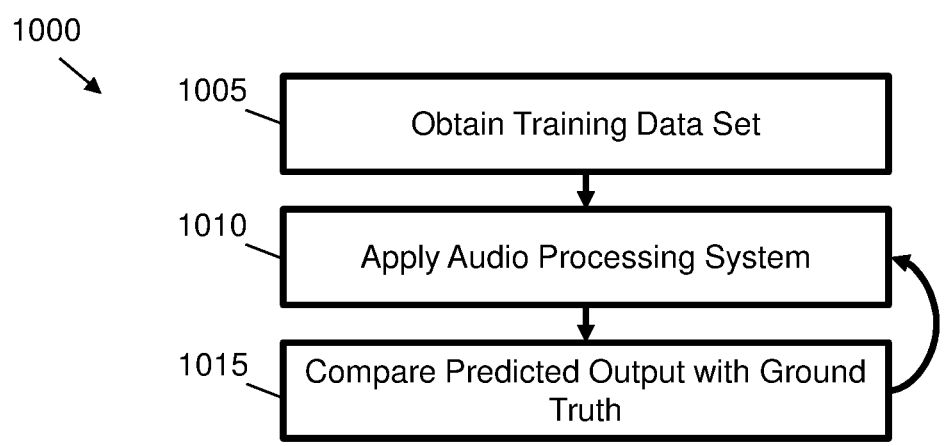
FIG. 10 is a flow diagram showing a method of training a neural network model according to an embodiment of the invention.

FIG. 9 shows a method 900 of processing audio data. The method may be implemented on any of the previously described audio processing systems, e.g. 100, 200 and 700 in FIGS. 1, 2 and 7. The method may alternatively be implemented by executing computer program code on one or more processors. The method 900 may represent an inference operation of the previously described audio processing systems (e.g. as contrasted with a training operation, which may be performed as shown in FIG. 10).

At block 910, audio data is processed with a convolutional neural network architecture. As described above, the audio data may be derived from one or more of raw audio data (e.g. WAV data), one or more spectrograms and an output of a Mel filter bank. Block 910 involves sequentially processing audio data using a plurality of convolutional groups arranged in series, as is shown by sub-block 915. The audio data may be processed along a data processing pipeline of the convolutional neural network architecture that comprises the convolutional groups, with certain convolutional groups being applied to an output of a previous convolutional group. Sub-block 915 includes combining, within a convolutional group, two data mappings arranged in parallel. For example, this combining may be performed using summation components 166, 330, 380, 830 or 880 in FIGS. 1, 3A, 3B, 8A or 8B. The convolutional groups may differ and a configuration for a given convolutional group may be based on one of the convolutional groups shown in FIGS. 1, 3A, 3B, 8A or 8B.

At block 920, at least an output of the convolutional neural network architecture is processed using a recurrent neural network architecture. In certain cases, the recurrent neural network architecture also processes at least a subset of the audio data via a skip connection (where the skip connection may apply one or more data mappings that differ from the convolutional neural network architecture). The recurrent neural network architecture may comprise a plurality of recurrent units such as a number of LSTM units or GRUs in series.

At block 930, the method 900 comprises processing at least an output of the recurrent neural network architecture using a feed-forward neural network architecture to determine a set of classification scores for a plurality of sound units associated with speech. The classification scores indicate a presence of one or more sound units in the audio data (e.g. may comprise a probability vector). The sound units may comprise senones, phones and/or phonemes.

In certain cases, sub-block 915 may comprise reducing a size of the audio data in one or more of data dimensions of the input (e.g. dimensions associated with time and frequency) using a plurality of convolutional operations that are applied in the one or more dimensions. For example, a convolutional neural network layer may not use padding in at least one dimension (e.g. time) and use a convolutional kernel with a size greater than 1 in that same dimension (or dimensions). In a case, where a 3×1 convolution kernel is used (in respective T×FREQ dimensions) and no padding is applied in both dimensions, then an output of the corresponding convolution operation may be reduced in size by 2 in the time dimension. As convolutions similar to this are repeated throughout the plurality of convolutional groups, the dimensionality of the data tensor being processed may be reduced. In addition, or alternatively, a stride greater than 1 may be used in a first convolutional group such as convolutional group 260-1 or 760-1. In this case, the convolutional neural network layers 312, 322 or 812, 822 may have a stride greater than 1 in the frequency dimension (e.g. 2 or greater). Padding may or may not be applied. This may reduce a size of features in the frequency dimension.

In certain implementations, the classification scores may be used by further neural network architectures so as to determine a text transcription of an utterance that is present within recorded audio data. For example, the audio processing systems described herein may be used as part of a larger Connectionist Temporal Classification (CTC) neural model to provide transcription and/or command translation. In other implementations, the classification scores may relate to a set of senones and be used as part of a hybrid neural-HMM acoustic model to determine a set of phoneme scores, where the HMM uses the classification scores as an a posteriori (or posterior) probability for senones. The output of the HMM, or a further neural model, may be supplied to a language model to perform a transcription of the recorded audio data. The method 900 may be repeated over a plurality of time periods relating to portion of captured speech (e.g. a number of seconds or minutes that feature an utterance from a user) to convert recorded audio data into machine or human useable data representing the content of the speech. When the method 900 is repeated, the audio data input to the audio processing system changes, e.g. as a time window moves forward in time a different multidimensional data tensor may be generated as an input.

Training an Audio Processing System

FIG. 10 shows a method 1000 of training an audio processing system. In the examples described herein the neural network architectures may be jointly trained, i.e. the audio processing system is considered to comprise a set of trainable parameters and these are trained in an end-to-end manner. Training may be performed initially to determine a set of trained parameters to perform an inference operation, e.g. as shown in FIG. 9. It should be noted that training may be performed at one location (e.g. on a central server) and then trained parameter values distributed to devices in order to perform inference in different locations (e.g. within embedded devices).

The method 1000 of FIG. 10 comprises a first block 1005 of obtaining a training data set comprising pairs of audio data and ground truth classifications. For example, the training data set may comprise audio recordings, where an audio recording has an associated plurality of multidimensional data tensors representing different discrete time steps (e.g. a result of passing a moving time window across the audio recording). The multidimensional data tensors may represent a set of spectrograms for the audio recording, e.g. similar to the way a video is represented by a set of images, where each spectrogram is centered around a different time period. The ground truth classifications indicate which of one or more sound units are associated with (e.g., present in) the audio data. For example, these may be provided as one-hot vectors if only one sound unit is deemed to be present for every time step.

Block 1010 in FIG. 10 comprises applying the audio processing system to the audio data within the training data set to determine predicted classification scores. For example, this may comprise supplying audio data from the training set for a given discrete time step to the input of the audio processing systems 100, 200 or 700. At block 1015, the output of the audio processing system, i.e. the classification scores 150, 250 or 750, are compared to a corresponding ground truth classification for the discrete time step as obtained from within the training data set. The comparison is used to determine an update to the plurality of trainable parameters that is backpropagated through the audio processing system. The comparison may form part of a loss function (such as a cross-entropy loss), and the loss function may be automatically differentiated with respect to the trainable parameters. The chain rule may be applied to backpropagate an update for the trainable parameters that is computed by analyzing the gradient of the differentiated loss function. Blocks 1010 and 1015 are iterated with respect to the training data set to train the plurality of trainable parameters. The audio data may be batched, and this batching may group consecutive audio data from an audio recording to allow the recurrent neural network layers to be unrolled for training.

Server Implementations

Figure 11:
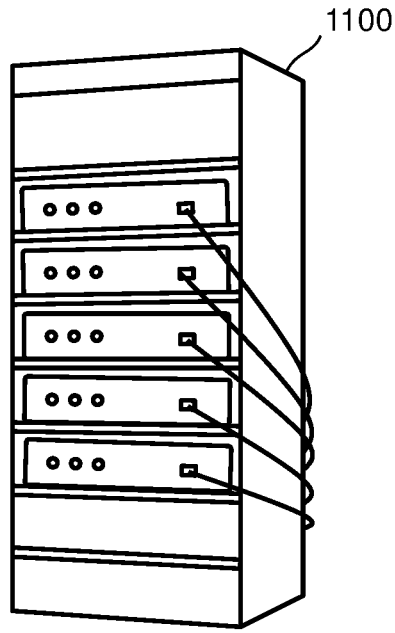
FIG. 11 is a schematic illustration of an example server device.

FIG. 11 shows a rack-mounted server blade multi-processor server system 1100 that may be used to implement the systems and/or perform the methods of the described examples. It comprises a multiplicity of network-connected computer processors that run software in parallel.

Figure 12:
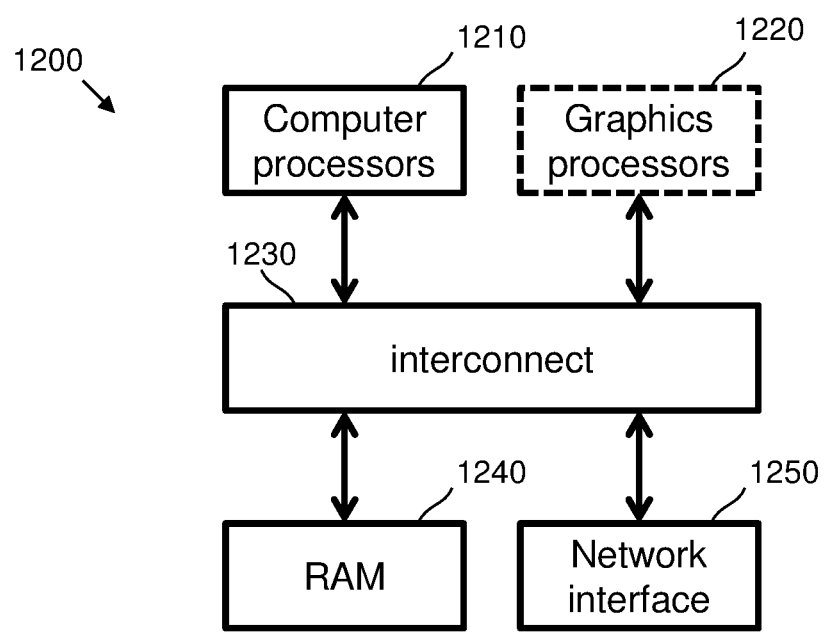
FIG. 12 is a schematic illustration showing components of the example server device of FIG. 11.

FIG. 12 shows a block diagram of the server system 1200. It comprises a multicore cluster of computer processor (CPU) cores 1210 and optionally a multicore cluster of graphics processor (GPU) cores 1220. The processors connect through a board-level interconnect 1230 to random-access memory (RAM) devices 1240 for program code and data storage. Server system 1200 also comprises a network interface 1250 to allow the processors to access a network such as a local area network (LAN) or the Internet. By executing instructions stored in RAM devices 1240 through interface 1230, the CPUs 1210 and/or GPUs 1220 perform steps of methods as described herein. Embedded and mobile devices, e.g. that may comprise the described audio processing system or perform at least the described inference methods, may have a similar arrangement of components but with fewer resources.

In certain examples, a non-transitory computer-readable storage medium may be provided that stores instructions to implement any of the described examples herein. For example, the instructions may, when executed by at least one processor, cause at least one processor to: obtain audio data; process at least the audio data with a convolutional neural network architecture, including a plurality of convolutional groups arranged in series, wherein each convolutional group comprises a combination of two data mappings arranged in parallel; process at least an output of the convolutional neural network architecture using a recurrent neural network architecture; and process at least an output of the recurrent neural network architecture using a feed-forward neural network architecture to determine a set of classification scores for a plurality of sound units associated with speech, the classification scores indicating a presence of one or more sound units in the audio data. The non-transitory computer readable medium may comprise one or more of a rotating magnetic disk, a rotating optical disk, a flash random access memory (RAM) chip, and other mechanically moving or solid-state storage media.

Example Implementations

Certain examples described herein may be applied to speech processing including automatic speech recognition. The neural network model described herein may be used to implement an acoustic model in a speech processing system. By combining different neural network architectures in series, and by using an efficient implementation for the convolutional neural network architecture that initially processes the audio data, an audio processing system may be provided that improves both (audio) frame level accuracy and word error rate, yet is able to perform inference quickly enough to be reactive in normal operating conditions (i.e. to allow real-time or near real-time operation).

Certain examples described herein may increase a frame level accuracy for a given set of computing resources. Frame level accuracy may be defined as the extent to which audio data is correctly mapped to a sound unit classification. In comparative cases, this mapping was performed on a per-audio-frame basis, e.g. using an output of a Mel filter bank for a given (10 millisecond) time window within an audio recording of audio data (e.g. at an audio frame processing rate of 100 Hz). In the present case, the convolutional neural network architecture allows multiple frames of audio data to be input, e.g. allows for additional frames surrounding a current frame of audio data to be input as a spectrogram-like two-dimensional data tensor. The convolutional neural network architecture is trained to extract and condense salient features from the input and the recurrent neural network architecture allows a certain amount of state to be tracked over consecutive time steps. The feed-forward neural network architecture then provides a mapping from an abstract output of the recurrent neural network architecture to the classification scores (e.g. probability values) for the sound units (e.g. senones).

Certain examples described herein may also reduce a word error rate for a given set of computing resources. Word error rate relates to how accurate a transcription is for real audio test data, e.g. when run through an automatic speech recognition (ASR) system using the trained audio processing system. In the present case, an increase in frame level accuracy may result in a lower word error rate. However, the relationship between frame level accuracy and word error rate is complex and indirect, making it difficult to know a priori which configurations of neural network components will be successful at increasing the frame level accuracy and decreasing the word error rate. The described examples have been developed to provide improvements in this area, while allowing efficient inference. For example, comparative neural acoustic models are typically unreasonable in their use of computing resources (e.g. hundreds of GPUs or TPUs). In contrast, the present examples provide "lighter" implementations (with respect to computing resource) that may provide much of the accuracy benefits of larger, more complex models while still maintaining runtime efficiency for practical applications.

Certain examples have been described herein, and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of humans and machines. Method examples are complete wherever in the world most constituent steps occur. Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof.

Practitioners skilled in the art will recognize many possible modifications and variations. The modifications and variations include any relevant combination of the disclosed features. Descriptions herein reciting principles, aspects, and examples encompass both structural and functional equivalents thereof.

The scope of the invention, therefore, is not intended to be limited to the examples shown and described herein. Rather, the scope and spirit of present invention is embodied by the appended claims.

What is claimed is:

1. An audio processing system comprising:
a convolutional neural network architecture to process audio data, wherein the convolutional neural network architecture includes:
a plurality of convolutional groups arranged in series, wherein at least one convolutional group of the plurality of convolutional groups includes a combination of at least two data mappings arranged in parallel;
a recurrent neural network architecture to process at least data derived from an output of the convolutional neural network architecture; and
a feed-forward neural network architecture to process at least data derived from an output of the recurrent neural network architecture,
wherein the feed-forward neural network architecture is configured to output classification scores for a plurality of sound units associated with speech, the classification scores indicating a presence of one or more sound units in the audio data.

2. The audio processing system of claim 1, wherein:
a first of the two data mappings includes a greater number of convolution operations than a second of the two data mappings, and
the second of the two data mappings includes a dimensionality reduction operation.

3. The audio processing system of claim 2, wherein a data tensor output by the dimensionality reduction operation has a size that matches a data tensor output by a set of convolution operations on the first of the two data mappings.

4. The audio processing system of claim 2, wherein the dimensionality reduction operation comprises a slice operation to discard data elements in one or more dimensions within the second of the two data mappings.

5. The audio processing system of claim 2, wherein the first of the two data mappings includes two convolution operations and the second of the two data mappings includes one of no convolution operations or one convolution operation.

6. The audio processing system of claim 1, wherein the audio data includes a data tensor with at least two dimensions: a first dimension representing features in time and a second dimension indicative of features in frequency.

7. The audio processing system of claim 6, wherein at least one of the plurality of convolutional groups includes a convolution operation on both of the two data mappings with a stride in the second dimension that is greater than one.

8. The audio processing system of claim 6, wherein the convolutional neural network architecture includes an initial convolution operation with a stride in the second dimension that is greater than one.

9. The audio processing system of claim 6, wherein a size of the audio data in at least one of the first dimension and the second dimensions is reduced within at least one of the convolutional groups without use of a pooling operation.

10. The audio processing system of claim 1, wherein at least one of the convolutional groups further comprises a batch normalization for data input to the at least one convolutional group as a pre-processing operation.

11. The audio processing system of claim 1, wherein the recurrent neural network architecture comprises a plurality of recurrent neural network layers arranged in series and the feed-forward neural network architecture comprises a plurality of feed-forward neural network layers arranged in series.

12. The audio processing system of claim 11, wherein at least one recurrent neural network layer is based on one of: a single-direction Long Short-Term Memory (LSTM) and a Gated Recurrent Unit (GRU).

13. The audio processing system of claim 1 further comprising a skip connection for a current audio frame within the audio data that allows the current audio frame to bypass the convolutional neural network architecture.

14. The audio processing system of claim 1 further comprising at least one feed-forward neural network layer between the convolutional neural network architecture and the recurrent neural network architecture, the at least one feed-forward neural network layer providing a one-dimensional data tensor as an input for the recurrent neural network architecture.

15. The audio processing system of claim 1, wherein the classification scores include probability values that are output by a softmax activation function of the feed-forward neural network architecture.

16. The audio processing system of claim 1, further comprising:
at least one attention layer within at least one of: the convolutional neural network architecture, the recurrent neural network architecture, and the feed-forward neural network architecture.

17. The audio processing system of claim 16, wherein the at least one attention layer is located within at least one of the two data mappings of the convolutional neural network architecture.

18. The audio processing system of claim 17, wherein one of the two data mappings has fewer convolutional operations, and the at least one attention layer includes an attention layer on the data mapping that has fewer convolutional operations, the attention layer being configured to output a data tensor that has a smaller size in one or more dimensions than an input data tensor.

19. The audio processing system of claim 1, further comprising an attention layer located between the convolutional neural network architecture and the recurrent neural network architecture.

20. The audio processing system of claim 1 further comprising an attention layer located between the recurrent neural network architecture and the feed-forward neural network architecture.

21. The audio processing system of claim 1 further comprising a skip connection for the audio data that allows the audio data to bypass the convolutional neural network architecture, wherein the skip connection comprises an attention layer that is applied to the audio data.

22. The audio processing system of claim 1 further comprising a frame selection component, which is located before the convolutional neural network architecture, that selects a plurality of audio frames to use as the audio data from a plurality of available audio frames.

23. The audio processing system of claim 1 further comprising a frequency selection component, which is located before the convolutional neural network architecture, that selects a subset of frequency bands for audio data to include in the audio data.

24. A method of processing audio data, the method comprising:
processing the audio data with a convolutional neural network architecture;
processing at least an output of the convolutional neural network architecture using a recurrent neural network architecture; and
processing at least an output of the recurrent neural network architecture using a feed-forward neural network architecture to determine a set of classification scores for a plurality of sound units associated with speech, the classification scores indicating a presence of one or more sound units in the audio data,
wherein processing the audio data with a convolutional neural network architecture includes:
processing the audio data using a plurality of convolutional groups arranged in series, at least one convolutional group of the plurality of convolutional groups including a combination of at least two data mappings arranged in parallel.

25. The method of claim 24, wherein processing the audio data using a plurality of convolutional groups arranged in series includes reducing a size of the audio data in one or more of data dimensions associated with time and frequency using a plurality of convolutional operations that are applied in the one or more data dimensions.

26. The method of claim 25, wherein at least one of the plurality of convolutional operations has a stride in a data dimension associated with frequency that is greater than one.

27. A method of training an audio processing system, the method comprising:
obtaining a training data set including pairs having audio data and ground truth classifications, wherein the ground truth classifications indicate which of one or more sound units are present in the audio data, the one or more sound units being associated with speech;
applying the audio processing system to the audio data to determine predicted classification scores, wherein the audio processing system comprises a plurality of neural networks architectures communicatively coupled in series including:
a convolutional neural network architecture;
a recurrent neural network architecture; and
a feed-forward neural network architecture,
wherein the plurality of neural networks architectures include an associated plurality of trainable parameters,
wherein the convolutional neural network architecture includes a plurality of convolutional groups arranged in series, at least one convolutional group of the plurality of convolutional groups comprising a combination of at least two data mappings arranged in parallel; and
comparing the predicted classification scores to the ground truth classifications of the training data set to determine an update to the plurality of trainable parameters that is backpropagated through the audio processing system, wherein the applying and the comparing are iterated with respect to the training data set to train the plurality of trainable parameters.

28. A non-transitory computer-readable storage medium storing instructions which, when executed by at least one processor, cause at least one processor to:
obtain audio data;
process the audio data using a convolutional neural network architecture, including a plurality of convolutional groups arranged in series, wherein at least one convolutional group in the plurality of convolutional groups includes a combination of at least two data mappings arranged in parallel;
process at least an output of the convolutional neural network architecture using a recurrent neural network architecture; and
process at least an output of the recurrent neural network architecture using a feed-forward neural network architecture to determine a set of classification scores for a plurality of sound units associated with speech, the classification scores indicating a presence of one or more sound units in the audio data.

* * * * *